United States Patent
Murata et al.

(10) Patent No.: US 10,775,521 B2
(45) Date of Patent: Sep. 15, 2020

(54) SENSOR APPARATUS, PLANNING PROCESSING SYSTEM, AND PLANNING METHOD

(71) Applicant: Hitachi, Ltd., Tokyo (JP)

(72) Inventors: Masaki Murata, Tokyo (JP); Shiro Mazawa, Tokyo (JP); Xiaoyun Lu, Tokyo (JP); Masayuki Miyazaki, Tokyo (JP); Hisato Kessoku, Tokyo (JP)

(73) Assignee: HITACHI, LTD., Tokyo (JP)

( * ) Notice: Subject to any disclaimer, the term of this patent is extended or adjusted under 35 U.S.C. 154(b) by 379 days.

(21) Appl. No.: 15/757,982

(22) PCT Filed: Apr. 7, 2017

(86) PCT No.: PCT/JP2017/014487
§ 371 (c)(1),
(2) Date: Mar. 7, 2018

(87) PCT Pub. No.: WO2017/221513
PCT Pub. Date: Dec. 28, 2017

(65) Prior Publication Data
US 2018/0246236 A1      Aug. 30, 2018

(30) Foreign Application Priority Data

Jun. 24, 2016   (JP) .................. 2016-125175

(51) Int. Cl.
*G01V 1/00*       (2006.01)
*G01V 1/16*       (2006.01)
(Continued)

(52) U.S. Cl.
CPC ............ *G01V 1/164* (2013.01); *G01P 15/131* (2013.01); *G01V 13/00* (2013.01); *G06Q 10/20* (2013.01);
(Continued)

(58) Field of Classification Search
CPC ...................................... G01V 1/164
See application file for complete search history.

(56) References Cited

FOREIGN PATENT DOCUMENTS

| JP | 2002-183511 A | 6/2002 |
|----|---------------|--------|
| JP | 2005-174008 A | 6/2005 |

OTHER PUBLICATIONS

International Search Report of PCT/JP2017/014487 dated May 16, 2017.

*Primary Examiner* — Tejal Gami
(74) *Attorney, Agent, or Firm* — Mattingly & Malur, PC

(57) ABSTRACT

Provided is a sensor apparatus including: a normal operation unit including a first sensor and a storage device; an external environment detection unit including a second sensor; a power supply switch unit configured to control supply of electric power to the normal operation unit; and a power supply configured to supply the electric power to the normal operation unit via the power supply switch unit. In the sensor apparatus, in an operational mode, the normal operation unit records data measured by the first sensor into the storage device, and, in a non-operational mode, when a measured value obtained by the second sensor satisfies a predetermined condition, the external environment detection unit controls the power supply switch unit so that the power supply switch unit supplies the electric power to the normal operation unit, and the normal operation unit records the data measured by the first sensor into the storage device.

15 Claims, 24 Drawing Sheets

(51) Int. Cl.
 *G06Q 50/02* (2012.01)
 *G01P 15/13* (2006.01)
 *G01V 13/00* (2006.01)
 *G06Q 10/00* (2012.01)
 *G06Q 30/02* (2012.01)
 *G06Q 30/06* (2012.01)
 *G01V 1/22* (2006.01)

(52) U.S. Cl.
 CPC ..... *G06Q 30/0283* (2013.01); *G06Q 30/0645* (2013.01); *G06Q 50/02* (2013.01); *G01V 1/003* (2013.01); *G01V 1/22* (2013.01)

OPERATIONAL STATE EXTERNAL ENVIRONMENT INFORMATION TABLE

NON-OPERATIONAL STATE EXTERNAL ENVIRONMENT INFORMATION TABLE

| SENSOR TERMINAL ID 21521 | DATE OF PURCHASE 21522 | LIFE AT TIME OF PURCHASE Hr 21523 | ACCUMULATED HOURS OF LIFE DECREASED DUE TO EXCESSIVE IMPACT DURING NON-OPERATIONAL STATE AND OPERATION STATE AT TIME OF LAST UPDATE 21524 | REMAINING LIFE AT TIME OF LAST UPDATE Hr 21525 | INDIVIDUAL CONSUMPTION LEVEL OF SENSOR TERMINAL 21526 | CUSTOMER ID 21527 | RENTAL PERIOD 21528 | LAST UPDATE DATE/TIME 21529 / 2152 |
|---|---|---|---|---|---|---|---|---|
| S-001 | 2015/1/9 | 100000 | 500 | 90740 | 13% | 001 | 2016/1/9 - 2016/9/1 | 2016/1/9 10:00:01 |
| S-002 | 2015/1/9 | 100000 | 300 | 90940 | 8% | 001 | 2016/1/9 - 2016/9/1 | 2016/1/9 10:00:01 |
| S-003 | 2015/1/9 | 100000 | 0 | 100000 | - | - | - | 2015/1/9 10:00:01 |
| S-004 | 2015/1/9 | 100000 | 100 | 90000 | - | 002 | 2016/3/6 - 2016/9/7 | 2015/9/9 |
| ... | ... | ... | ... | ... | ... | ... | ... | ... |

SENSOR TERMINAL INFORMATION TABLE

*FIG. 9*

ACCUMULATED HOURS OF LIFE DECREASED DUE TO EXCESSIVE IMPACT DURING NON-OPERATIONAL STATE AND OPERATION STATE AT TIME OF LAST UPDATE (AFTER UPDATE)

= ACCUMULATED HOURS OF LIFE DECREASED DUE TO EXCESSIVE IMPACT DURING NON-OPERATIONAL STATE AND OPERATION STATE AT TIME OF LAST UPDATE (BEFORE UPDATE)
+ HOURS OF LIFE DECREASED DUE TO EXCESS VALUE OF IMPACT DURING OPERATIONAL STATE (FROM TIME OF LAST UPDATE BEFORE UPDATE TO CURRENT TIME POINT)
+ HOURS OF LIFE DECREASED DUE TO EXCESS VALUE OF IMPACT DURING NON-OPERATIONAL STATE (FROM TIME OF LAST UPDATE BEFORE UPDATE TO CURRENT TIME POINT)

= ACCUMULATED HOURS OF LIFE DECREASED DUE TO EXCESSIVE IMPACT DURING NON-OPERATIONAL STATE AND OPERATION STATE AT TIME OF LAST UPDATE (BEFORE UPDATE)
+ $\sum f$(EXCESS VALUE OF IMPACT DURING OPERATIONAL STATE) (FROM TIME OF LAST UPDATE BEFORE UPDATE TO CURRENT TIME POINT)   *1
+ $\sum f$(EXCESS VALUE OF IMPACT DURING NON-OPERATIONAL STATE) (FROM TIME OF LAST UPDATE BEFORE UPDATE TO CURRENT TIME POINT)   *2

*1 HOURS OF LIFE DECREASED DUE TO EXCESS VALUE OF IMPACT DURING OPERATIONAL STATE
= $f$(EXCESS VALUE OF IMPACT DURING OPERATIONAL STATE)

*2 HOURS OF LIFE DECREASED DUE TO EXCESS VALUE OF IMPACT DURING NON-OPERATIONAL STATE
= $f$(EXCESS VALUE OF IMPACT DURING NON-OPERATIONAL STATE)

*FIG. 11A*

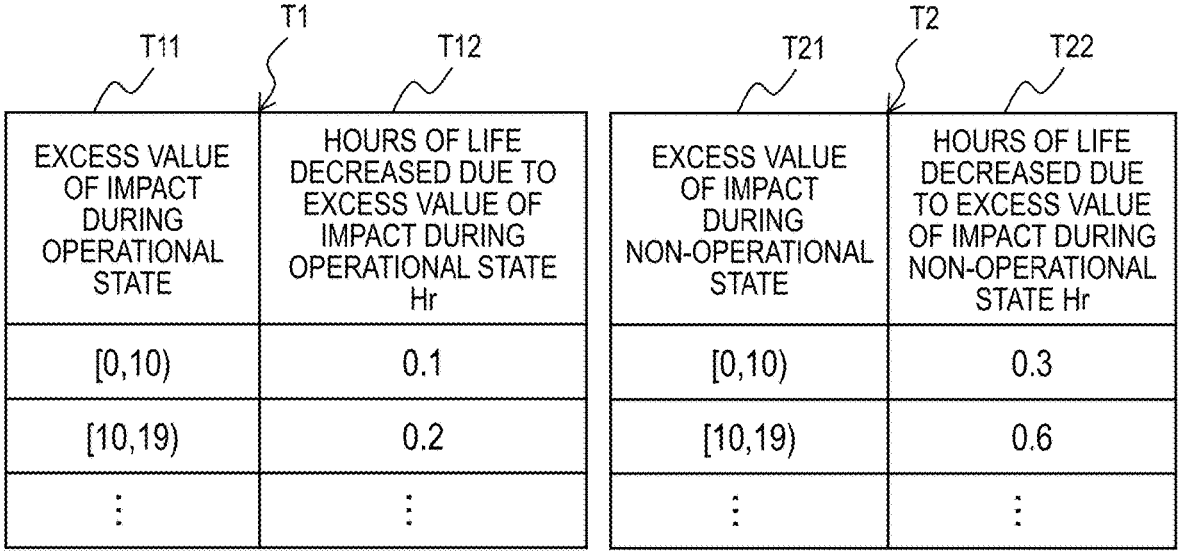

FIG. 11B

REMAINING LIFE AT TIME OF LAST UPDATE

= LIFE AT TIME OF PURCHASE
- DECREASE IN LIFE DUE TO AGED DETERIORATION AT CURRENT TIME POINT
- ACCUMULATED HOURS OF LIFE DECREASED DUE TO EXCESSIVE IMPACT DURING NON-OPERATIONAL STATE AND OPERATION STATE AT TIME OF LAST UPDATE (AFTER UPDATE)

= LIFE AT TIME OF PURCHASE
- (CURRENT TIME POINT − DATE OF PURCHASE)
- ACCUMULATED HOURS OF LIFE DECREASED DUE TO EXCESSIVE IMPACT DURING NON-OPERATIONAL STATE AND OPERATION STATE AT TIME OF LAST UPDATE (AFTER UPDATE)

FIG. 11C $$\text{INDIVIDUAL CONSUMPTION LEVEL OF SENSOR TERMINAL}$$

$$= \frac{\text{DECREASE IN LIFE (WITHIN RELEVANT RENTAL PERIOD AND AT END OF RELEVANT RENTAL PERIOD)}}{\text{RENTAL HOURS (WITHIN RELEVANT RENTAL PERIOD)}}$$

$$= \frac{\text{(HOURS OF LIFE DECREASED DUE TO EXCESSIVE IMPACT DURING OPERATIONAL STATE + HOURS OF LIFE DECREASED DUE TO EXCESSIVE IMPACT DURING NON-OPERATIONAL STATE)}}{\text{RENTAL HOURS (WITHIN RELEVANT RENTAL PERIOD)}}$$

$$= \frac{\left(\sum f \text{ (EXCESS VALUE OF IMPACT DURING OPERATIONAL STATE)}\atop \text{NUMBER OF TIMES OF IMPACT}\right) + \left(\sum f \text{ (EXCESS VALUE OF IMPACT DURING NON-OPERATIONAL STATE)}\atop \text{NUMBER OF TIMES OF IMPACT}\right)}{\text{RENTAL HOURS (WITHIN RELEVANT RENTAL PERIOD)}}$$

\* INDIVIDUAL CONSUMPTION LEVEL OF SENSOR TERMINAL IS CALCULATED AT END OF RENTAL PERIOD (WHEN CUSTOMER RETURNS SENSOR TERMINAL)

*FIG. 13*

CUSTOMER INFORMATION TABLE

2151

| CUSTOMER ID 21511 | CUSTOMER NAME 21512 | CUSTOMER-BY-CUSTOMER CONSUMPTION LEVEL 21513 | RETURN RATE OF SENSOR TERMINALS 21514 | CUSTOMER RELIABILITY LEVEL 21515 | SENSOR TERMINAL ID 21516 | SENSOR TERMINAL OPERATIONAL TIME Hr 21517 | RENTAL START DATE/TIME 21518 | RETURN DATE/TIME 21519 |
|---|---|---|---|---|---|---|---|---|
| 001 | EXPLORATION COMPANY AA | 35% | 95% | L2 | S-001 | 4,120 | 2016/1/10 10:00:00 | 2016/9/1 10:00:00 |
| 001 | EXPLORATION COMPANY AA | 35% | 95% | L2 | S-002 | 3,890 | 2016/1/10 10:00:00 | 2016/9/1 10:00:00 |
| 001 | EXPLORATION COMPANY AA | 35% | 95% | L2 | S-003 | - | 2016/1/10 10:00:00 | - |
| 002 | EXPLORATION COMPANY BB | 56% | 85% | L3 | S-004 | - | 2016/3/10 10:00:00 | - |
| ... | ... | ... | ... | ... | ... | ... | ... | ... |

*FIG. 14*

$$\text{RETURN RATE OF SENSOR TERMINALS} = \frac{\text{NUMBER OF RETURNED SENSOR TERMINALS}}{\text{NUMBER OF RENTED SENSOR TERMINALS}}$$

*FIG. 16A*

$$\text{ENTIRE CONSUMPTION LEVEL OF SENSOR TERMINALS} = \frac{1}{\text{NUMBER OF SENSOR TERMINALS: } n} \sum_{k=1}^{n} \text{INDIVIDUAL CONSUMPTION LEVEL OF SENSOR TERMINAL}$$

*FIG. 16B*

CUSTOMER-BY-CUSTOMER CONSUMPTION LEVEL
= α × ENTIRE CONSUMPTION LEVEL OF SENSOR TERMINALS AT END OF RELEVANT RENTAL PERIOD
+ (1-α) × PREVIOUS CUSTOMER-BY-CUSTOMER CONSUMPTION LEVEL

\* α REPRESENTS MOVING AVERAGE COEFFICIENT OF FROM 0 TO 1
\* CUSTOMER-BY-CUSTOMER CONSUMPTION LEVEL IS CALCULATED AT END OF RENTAL PERIOD IN RELEVANT OPERATION CYCLE
(WHEN CUSTOMER RETURNS SENSOR TERMINAL)

*FIG. 16C*

EXAMPLE OF TABLE FOR CUSTOMER RELIABILITY LEVEL EVALUATION METHOD AND CONVERSION INTO RATE CORRESPONDING TO CUSTOMER RELIABILITY LEVEL

RENTAL FEE OF INDIVIDUAL SENSOR TERMINAL
(CUSTOMER RELIABILITY LEVEL IS NOT TAKEN INTO CONSIDERATION)

$$= \frac{\text{PRICE} + (\text{INTEREST RATE} + \text{TAX} + \text{INSURANCE FEE}) + \text{MAINTENANCE AND STORAGE COST} + \text{PROFIT OF SENSOR TERMINAL}}{\text{REMAINING LIFE OF SENSOR TERMINAL} \times \text{RENTAL TURNOVER RATE OF SENSOR TERMINAL}}$$

$\times$ RENTAL HOURS

FIG. 19A

RENTAL FEE OF INDIVIDUAL SENSOR TERMINAL
(CUSTOMER RELIABILITY LEVEL IS TAKEN INTO CONSIDERATION)

$$= \frac{\text{PRICE} + (\text{INTEREST RATE} + \text{TAX} + \text{INSURANCE FEE}) + \text{MAINTENANCE AND STORAGE COST} + \text{PROFIT OF SENSOR TERMINAL}}{\text{REMAINING LIFE OF SENSOR TERMINAL} \times \text{RENTAL TURNOVER RATE OF SENSOR TERMINAL}}$$

$\times$ RENTAL HOURS $\times$ (1-RATE CORRESPONDING TO CUSTOMER RELIABILITY LEVEL)

FIG. 19B

RENTAL FEE OF INDIVIDUAL SENSOR TERMINAL
(CUSTOMER RELIABILITY LEVEL IS NOT TAKEN INTO CONSIDERATION)

$$= \frac{\text{PRICE} + (\text{INTEREST RATE} + \text{TAX} + \text{INSURANCE FEE}) + \text{MAINTENANCE AND STORAGE COST} + \text{PROFIT OF SENSOR TERMINAL}}{\text{REMAINING LIFE OF SENSOR TERMINAL} \times \text{RENTAL TURNOVER RATE OF SENSOR TERMINAL} \times \text{RENTAL HOURS} \times \text{DISCOUNT RATE DUE TO ADVANCE PAYMENT}}$$

*FIG. 21A*

RENTAL FEE OF INDIVIDUAL SENSOR TERMINAL
(CUSTOMER RELIABILITY LEVEL IS TAKEN INTO CONSIDERATION)

$$= \frac{\text{PRICE} + (\text{INTEREST RATE} + \text{TAX} + \text{INSURANCE FEE}) + \text{MAINTENANCE AND STORAGE COST} + \text{PROFIT OF SENSOR TERMINAL}}{\text{REMAINING LIFE OF SENSOR TERMINAL} \times \text{RENTAL TURNOVER RATE OF SENSOR TERMINAL} \times \text{RENTAL HOURS} \times \text{DISCOUNT RATE DUE TO ADVANCE PAYMENT} \times (1 - \text{RATE CORRESPONDING TO CUSTOMER RELIABILITY LEVEL})}$$

*FIG. 21B*

| SENSOR TERMINAL ID | CUSTOMER ID | CUSTOMER NAME | RENTAL HOURS hr | CUSTOMER RELIABILITY LEVEL | RATE CORRESPONDING TO CUSTOMER RELIABILITY LEVEL | REMAINING LIFE OF SENSOR TERMINAL AT TIME OF RETURN | REMAINING LIFE OF SENSOR TERMINAL AT TIME OF START OF RENTAL | RENTAL FEE ¥ |
|---|---|---|---|---|---|---|---|---|
| S-001 | 001 | EXPLORATION COMPANY AA | 4,120 | L1 | 15% | - | 2000 | 1890 |
| S-002 | 001 | EXPLORATION COMPANY AA | 4,120 | L1 | 15% | - | 2679 | 1673 |
| ... | ... | ... | ... | ... | ... | ... | ... | ... |

RENTAL FEE RESULT TABLE

FIG. 22

SENSOR APPARATUS, PLANNING PROCESSING SYSTEM, AND PLANNING METHOD

CLAIM OF PRIORITY

The present application claims priority from Japanese patent application JP 2016-125175 filed on Jun. 24, 2016, the content of which is hereby incorporated by reference into this application.

BACKGROUND OF THE INVENTION

This invention relates to a sensor terminal apparatus and a service planning system, and more particularly, to a planning method for optimizing a rental fee and a maintenance plan.

When a company requires a machine or an apparatus, the company rents the machine or the apparatus from a rental company, and pays a rental fee for the rented machine or apparatus, to thereby avoid temporary payment of a large amount of money to purchase the machine or the apparatus. The rental company purchases a machine and an apparatus in place of the company, and rents a machine or an apparatus to the company for a fixed period.

In the oil and gas (hereinafter referred to as "OAG") industry, in order to explore oil and gas, an exploration company installs several tens of thousands of sensor terminals to examine the structure of geological strata, and rents the sensor terminals from a rental company in many cases. When a sensor terminal to be repaired and maintained by the rental company fails during a period in which the sensor terminal is rented to the exploration company, the rental company incurs cost that is originally unnecessary, for example, cost for transporting an alternative terminal, whereas the exploration company incurs loss, for example, extension of a period of exploration.

Further, in order to finely examine the structure of geological strata, several hundreds of thousands to several millions of sensor terminals are said to be required. It is therefore important for the exploration company to rent highly reliable sensor terminals from the rental company at a proper price without owning a large number of sensors by itself, to thereby shorten the period of exploration and reduce cost. In addition, the rental company is required to maintain and manage an enormous number of devices and optimize a rental fee of the device.

In order to make an appropriate rental contract, there has been known a system in which operational information on a machine or an apparatus is acquired, a remaining value of the machine or the apparatus is calculated based on the operational information, and a rental fee is calculated based on the remaining value.

For example, in JP 2005-174008 A, there is disclosed a machine fee calculation system configured to calculate a lease fee or rental fee of a machine to be leased or rented for use. The system includes: operational information acquisition means, which is installed in the machine, for acquiring operational information on the machine; load status accumulation means for accumulating load status data on a load imposed on the machine due to use of the machine; load status update means for updating the load status data accumulated in the load status accumulation means based on the operational information acquired by the operational information acquisition means; and remaining value calculation means for calculating a remaining value of the machine based on the accumulated load status data.

Further, in JP 2002-183511 A, there is disclosed a method of selling a machine in consideration of use history. A configuration for executing the method substantially includes: standard remaining value calculation means for calculating an estimate of a construction machine (machine or vehicle) to be given to a user; estimate calculation means; a standard condition database (standard condition or standard condition DB); an operation environment condition database (operation environment condition or operation environment condition DB); a use condition database (use condition or use condition DB); a maintenance history database (maintenance history or maintenance history DB); and a load condition database (load condition or load condition DB).

In such related-art systems, the remaining value and the rental fee of a machine or an apparatus are set based on a use status (operational information or maintenance history information) of the machine or the apparatus. Thus, an exploration company can shorten a period of exploration by renting a highly reliable sensor terminal, and can also suppress cost for exploration with a reasonable rental fee.

SUMMARY OF THE INVENTION

However, the technology described in JP 2005-174008 A focuses on a remaining value of a rental machine or apparatus that uses only the information obtained during an operational state of the machine or apparatus, and damage or deterioration caused during a non-operational state thereof (i.e., when the machine or apparatus is transported or stored), is not taken into consideration. A machine or an apparatus may be damaged by impact during the transportation depending on the structure of the machine or the apparatus, and may deteriorate depending on load, temperature/humidity, or illuminance during the storage. For example, in a sensor terminal for OAG exploration, deterioration caused by impact during a non-operational state may be larger than deterioration caused by impact during an operational state depending on its internal structure. Therefore, the rental company does not grasp a remaining value of a machine or an apparatus that is obtained in consideration of an external environment during the non-operational state, and thus may rent a machine or an apparatus having a high risk of failure, leading to a fear that maintenance cost, for example, cost for transporting an alternative machine or apparatus, may increase. There is also a fear that a work period may extend due to a failure of the machine or the apparatus.

Further, in JP 2002-183511 A, there is disclosed a method of setting a rental fee in consideration of maintenance history information on, for example, whether maintenance such as replacement timing of a consumable used in a rental machine or apparatus was performed on standard maintenance time or delayed from the predetermined standard time, but in the technology described in JP 2002-183511 A, there is no means for acquiring information on the non-operational state other than information on maintenance. Moreover, when the level of deterioration of a rented machine or apparatus differs depending on how a customer of the rental company (hereinafter referred to as "customer") uses the machine or the apparatus (e.g., environment in which the machine or the apparatus is used, or method in which the machine or the apparatus is used), a rental fee is not calculated in consideration of a customer reliability level with which how the customer uses the machine or the apparatus is evaluated.

In short, it is required to calculate, for example, an accurate remaining life in order to set an appropriate rental fee, but there is a problem in the related art in that non-operational information obtained during the transportation or storage is not taken into consideration.

In view of the above, it is an object of this invention to provide a service planning system and method for calculating an accurate remaining life in consideration of influence exerted during an operational state and influence exerted during a non-operational state, and a sensor terminal therefor.

The representative aspect of the inventions disclosed in this application is outlined as follows. There is provided a sensor apparatus, comprising: a normal operation unit including a first sensor configured to detect an external environment and a storage device; an external environment detection unit including a second sensor configured to detect an external environment; a power supply switch unit configured to control supply of electric power to the normal operation unit; and a power supply configured to supply the electric power to the normal operation unit via the power supply switch unit. In an operational mode, the normal operation unit records data measured by the first sensor into the storage device. In a non-operational mode, when a measured value obtained by the second sensor satisfies a predetermined condition, the external environment detection unit controls the power supply switch unit so that the power supply switch unit supplies the electric power to the normal operation unit, and the normal operation unit records the data measured by the first sensor into the storage device.

According to the one embodiment of this invention, the remaining life of the sensor apparatus can be accurately calculated in consideration of the influence exerted during the operational state and the influence exerted during the non-operational state. Problems, configurations, and effects other than those described above are made clear from the following description of embodiments of this invention.

BRIEF DESCRIPTION OF THE DRAWINGS

FIG. 9 is a diagram for illustrating a configuration example of a sensor terminal information table.

FIG. 11A is a diagram for illustrating an example of an expression for calculating accumulated hours of life decreased due to excessive impact during non-operational state and operation state at time of last update.

FIG. 11B is a diagram for illustrating an example of a table for calculating accumulated hours of life decreased due to excessive impact during non-operational state and operation state at the time of last update.

FIG. 11C is a diagram for illustrating an example of an expression for calculating the sensor terminal remaining life.

FIG. 13 is a diagram for illustrating an example of an expression for calculating individual sensor terminal consumption level.

FIG. 14 is a diagram for illustrating an example of a configuration of a customer information table.

FIG. 16A is a diagram for illustrating an example of an expression for calculating a sensor terminal return rate.

FIG. 16B is a diagram for illustrating an example of an expression for calculating an entire sensor terminal consumption level.

FIG. 16C is a diagram for illustrating an example of an expression for calculating a customer-by-customer consumption level.

FIG. 19A is a diagram for illustrating an example of an expression for calculating a rental fee of an individual sensor terminal at the time of return in which the customer reliability level is not taken into consideration.

FIG. 19B is a diagram for illustrating an example of an expression for calculating a rental fee of an individual sensor terminal at the time of return in which the customer reliability level is taken into consideration.

FIG. 21A is a diagram for illustrating an example of an expression for calculating a rental fee of an individual sensor terminal at the time of start of rental in which the customer reliability level is not taken into consideration.

FIG. 21B is a diagram for illustrating an example of an expression for calculating a rental fee of an individual sensor terminal at the time of start of rental in which the customer reliability level is taken into consideration.

FIG. 22 is a diagram for illustrating an example of a configuration of a rental fee result table.

DETAILED DESCRIPTION OF THE PREFERRED EMBODIMENTS

Figure 1:
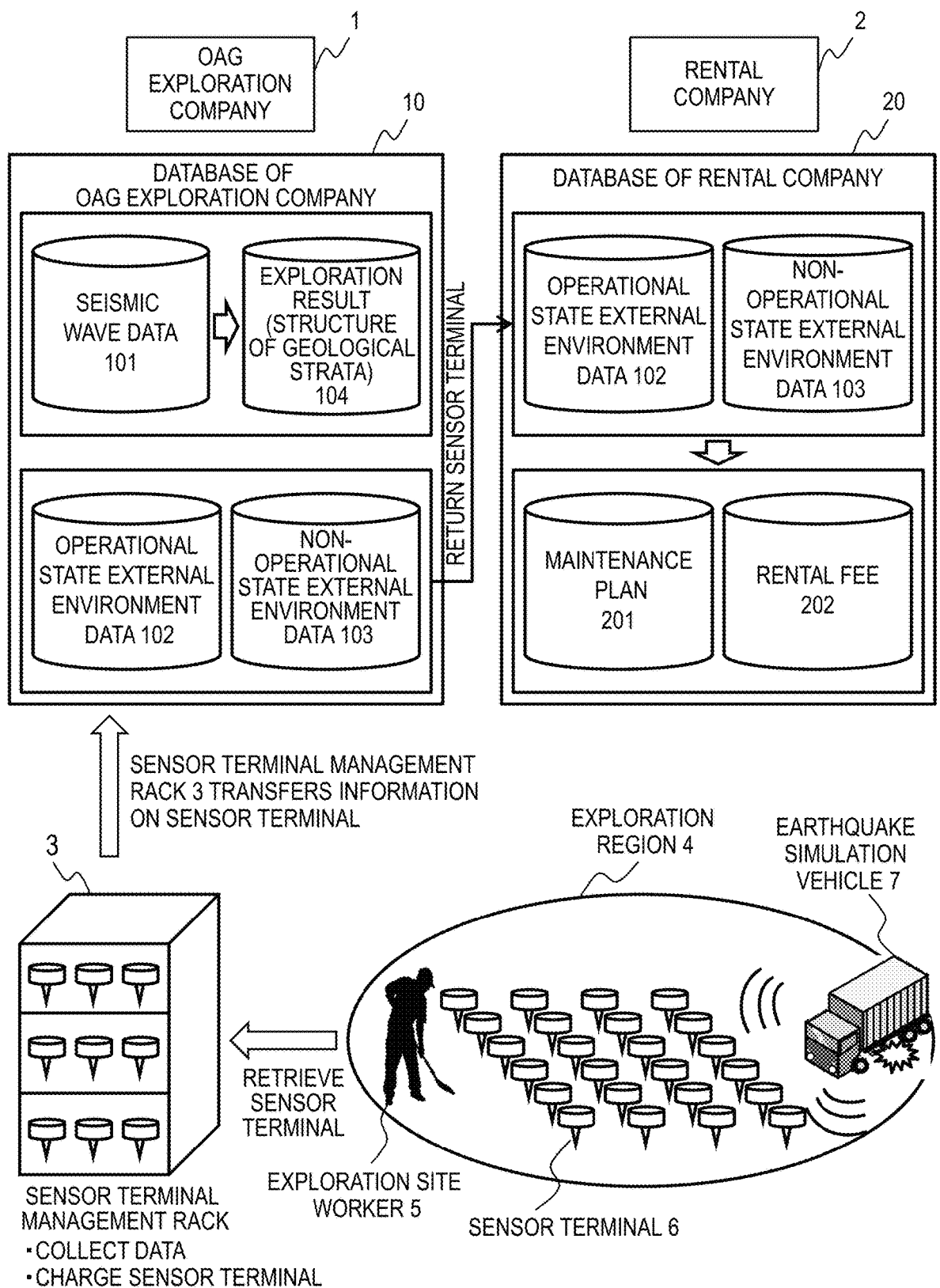
FIG. 1 is a diagram for illustrating an overview of a sensor terminal rental business according to an embodiment.

In embodiments of this invention, a description is given of configurations of a sensor terminal apparatus and a service planning system in a rental business of a sensor terminal for oil and gas (OAG) exploration (hereinafter referred to as "sensor terminal"). More specifically, a description is given of a system for collecting operational information and non-operational information on the sensor terminal and a system in which the operational information and the non-operational information collected from the sensor terminal are utilized to calculate a remaining life of the sensor terminal and evaluate a customer reliability level, which are reflected in calculation of a rental fee and a maintenance plan.

A main configuration of the embodiments is a sensor terminal illustrated in FIG. 5A and FIG. 5B, and an operational state and a non-operational state of the sensor terminal are defined as follows. The "operational state" is a state in which a site worker of OAG exploration switches on an operational switch 611, and an external environment measurement sensor 606 (e.g., seismic wave measurement sensor configured to measure acceleration) included in the sensor terminal is in operation. The "non-operational state" is a state in which the site worker switches off the operational switch 611, and the external environment measurement sensor 606 included in the sensor terminal is not in operation.

Now, embodiments of this invention are described in detail referring to the drawings.

FIG. 1 is a diagram for illustrating an overview of a sensor terminal rental business according to the embodiments.

The purpose of OAG exploration is to find out the structure of geological strata (oil and gas reservoir strata) of an exploration region 4. An exploration method to be performed by an OAG exploration company 1, for example, reflection seismic exploration, is to install sensor terminals in the exploration region 4, artificially generate an earthquake in the vicinity of the earth's surface, and measure and record seismic waves that have propagated under the ground with the sensor terminals, to thereby collect seismic wave data and analyze the structure of geological strata through use of the collected seismic wave data. In large-scale seismic exploration, the OAG exploration company 1 rents sensor terminals 6 from a rental company 2, and transports the rented sensor terminal 6 to the exploration region 4. An exploration site worker 5 installs the sensor terminals 6 in the exploration region 4. The OAG exploration company 1 uses the installed sensor terminals 6 to collect seismic wave data 101 on seismic waves caused by an artificial earthquake generated by an earthquake simulation vehicle 7, and analyzes an exploration result (structure of geological strata) 104 of the exploration region 4 based on the seismic wave data 101.

In order to calculate a remaining life and rental fee of the sensor terminal 6, the rental company 2 prepares the sensor terminal 6 capable of collecting operational information and non-operational information. In addition to the function of collecting the seismic wave data 101, the sensor terminal 6 collects operational state external environment data 102 and non-operational state external environment data 103 of the sensor terminal 6. After one exploration is finished, the OAG exploration company 1 retrieves the sensor terminals 6 from the exploration region 4, and stores those sensor terminals 6 in a sensor terminal management rack 3. The sensor terminal management rack 3 collects data stored in the sensor terminal 6 (seismic wave data 101, operational state external environment data 102 and non-operational state external environment data 103 of sensor terminal 6, and other data), and transfers the collected data to a database 10 of the OAG exploration company 1 when required. Further, the sensor terminal management rack 3 charges the sensor terminal 6.

In the database 10 of the OAG exploration company 1, the seismic wave data 101, the operational state external environment data 102 of the sensor terminal, the non-operational state external environment data 103 of the sensor terminal, and the exploration result 104 of the exploration region 4, which is obtained by analyzing the seismic wave data 101, are stored. When returning the sensor terminal 6 to the rental company 2, the OAG exploration company 1 transfers the operational state external environment data 102 and the non-operational state external environment data 103 of the sensor terminal 6 to a database 20 of the rental company 2. The rental company 2 calculates a rental fee 202 in consideration of the operational state external environment data 102 and the non-operational state external environment data 103, and develops a service plan, for example, a maintenance plan 201.

In the above-mentioned configuration example, the sensor terminal management rack 3 transfers not only the seismic wave data 101 but the operational state external environment data 102 and the non-operational state external environment data 103 of the sensor terminal 6 to the database 10 of the OAG exploration company. However, the operational state external environment data 102 and the non-operational state external environment data 103 are not always required to be transferred to the database 10 of the OAG exploration company, and may be directly transferred to the database 20 of the rental company 2 without being transferred to the database 10 of the OAG exploration company 1.

Figure 2:
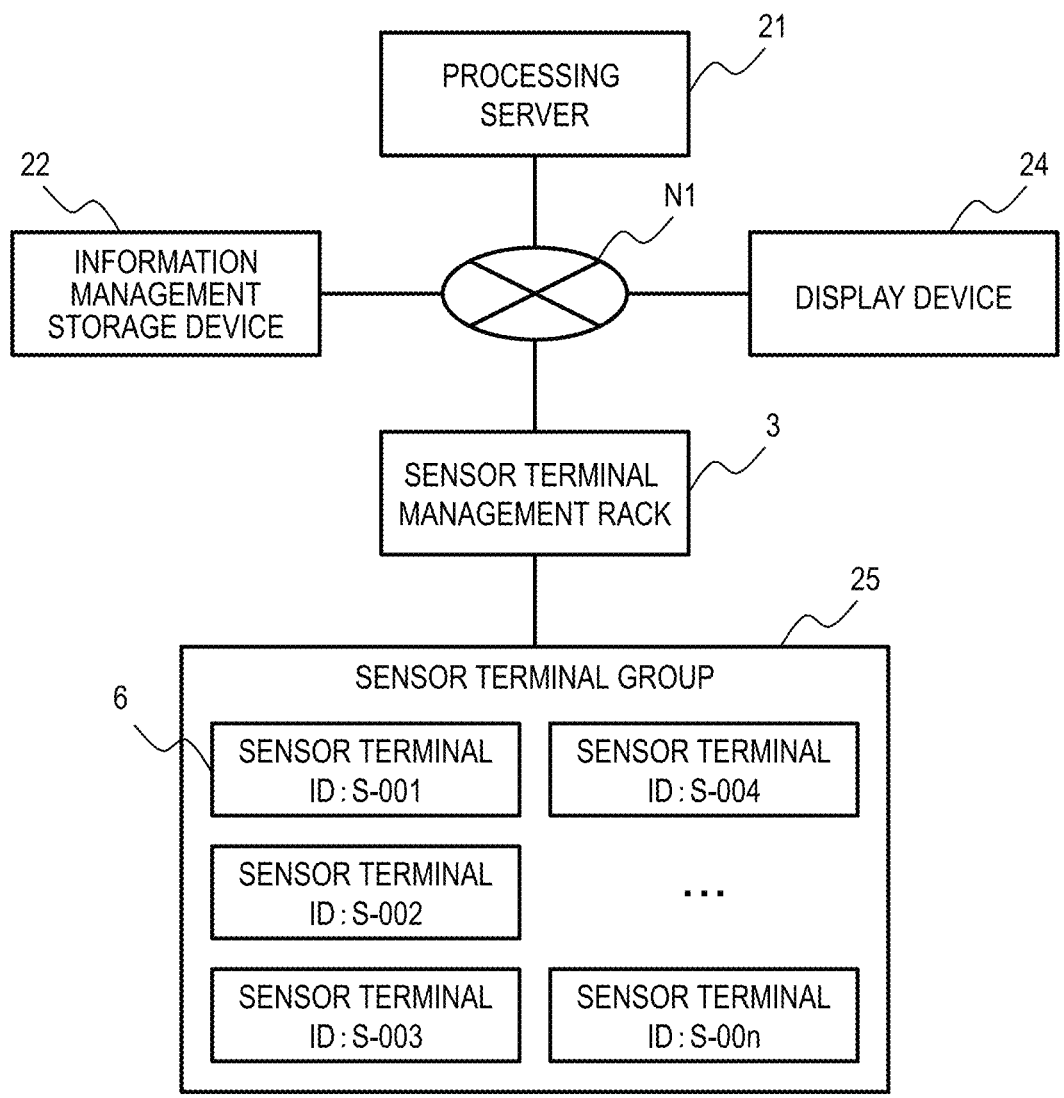
FIG. 2 is a diagram for illustrating an overall configuration of a service planning system according to the embodiments.

FIG. 2 is a diagram for illustrating an overall configuration of a service planning system according to the embodiments.

The service planning system includes a processing server 21, an information management storage device 22, the sensor terminal management rack 3, a display device 24, and a sensor terminal group 25. Further, the processing server 21, the information management storage device 22, the sensor terminal management rack 3, and the display device 24 are coupled to one another via a network N1 in a manner that allows communication thereamong.

The information management storage device 22 is a general storage device, and includes, for example, a central processing unit (CPU), and a hard disk drive (HDD) or other such storage medium. The information management storage device 22 stores customer information and sensor terminal information that are required for the processing server 21 to execute a processing program.

The sensor terminal management rack 3 collects data of the sensor terminal 6, stores the collected data, and transfers the data to the processing server 21. Further, the sensor terminal management rack 3 charges the sensor terminal 6.

The display device 24 is a terminal apparatus including, for example, an input unit capable of receiving a general instruction and a display screen capable of displaying data, and is a personal computer or a tablet terminal, for example. Specifically, the display device 24 includes a communication interface configured to transmit and receive data to and from other apparatus including the processing server 21, the input unit configured to receive an instruction, a CPU configured to execute a program, a display unit configured to display a screen, and a storage unit configured to store data and a program.

For example, in the display device 24, a calculation condition input program 2451 and a screen display program 2452 operate, and those programs receive input of a calculation condition from a user and display an execution result of a program on the display unit. The calculation condition input program 2451 and the screen display program 2452 may be executed through a web browser or may be a dedicated application program.

First Embodiment

Now, a description is given of an example in which the processing server 21 calculates the remaining life of the sensor terminal 6 based on the operational state external environment data 102 and the non-operational state external environment data 103, which are acquired by the sensor terminal 6.

Figure 3:
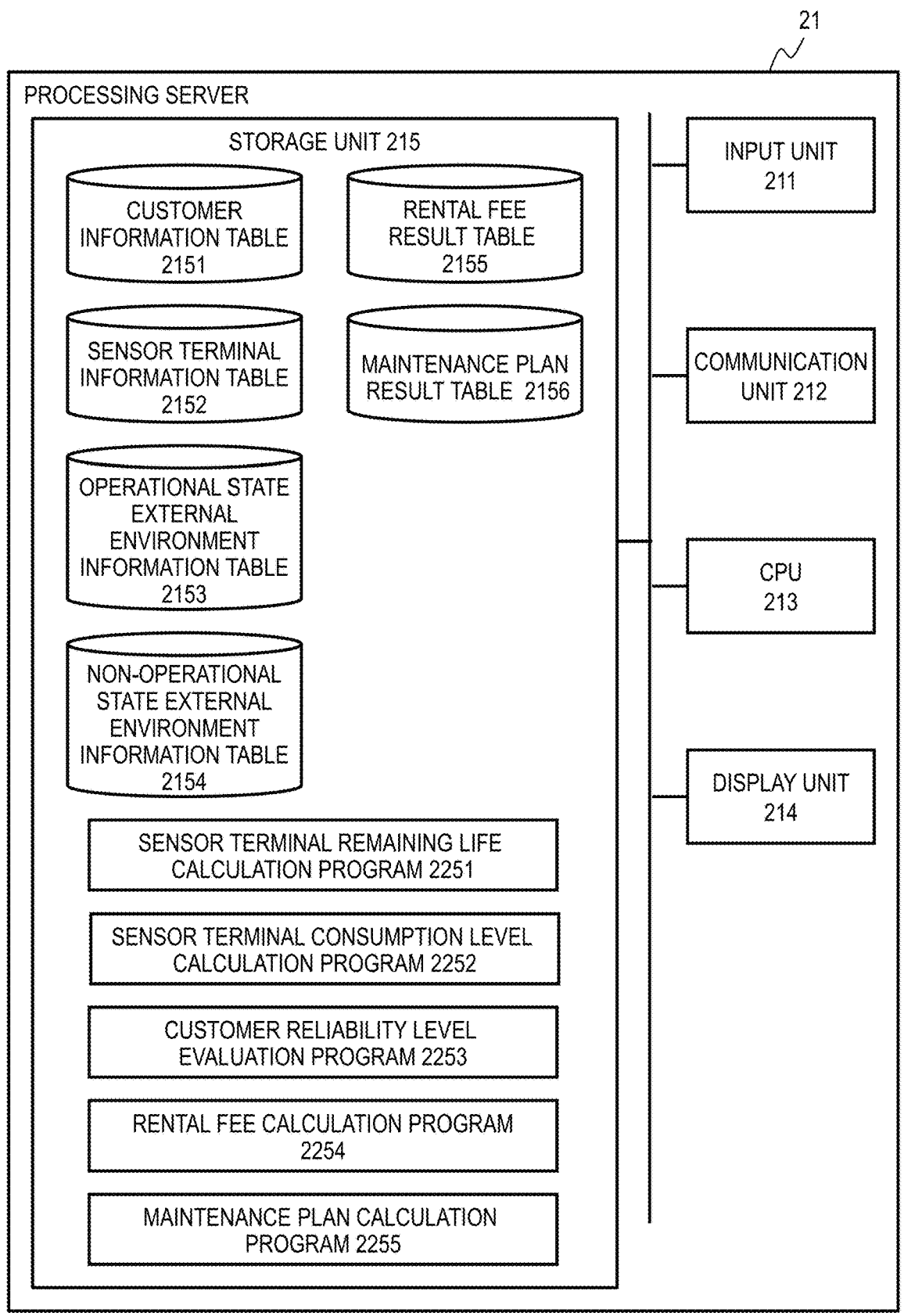
FIG. 3 is a diagram for illustrating a configuration of a processing server.

FIG. 3 is a diagram for illustrating a configuration of the processing server 21.

The processing server 21 includes an input unit 211, a communication unit 212, a CPU 213, a display unit 214, and a storage unit 215.

The input unit 211 is an interface configured to receive an instruction from an administrator (employee of rental company), and is formed of a keyboard and a mouse, for example. The communication unit 212 is an interface configured to transmit and receive data to and from other apparatus in accordance with a predetermined protocol via the network N1, and is formed of a network interface card (NIC), for example. The CPU 213 is a processor configured to execute a processing program for referring to data stored in the processing server 21 to execute overall control on the operation of the processing server 21. The display unit 214 is a display device configured to display, on a screen, data stored in the storage unit 215, a processing result obtained by a program, and others, and is formed of a liquid crystal display (LCD), for example.

The storage unit 215 is formed of a memory and an auxiliary storage device, and stores input data to be processed by the processing server 21 and processing programs to be executed by the CPU 213. The memory includes a ROM, which is a non-volatile storage element, and a RAM, which is a volatile storage element. The ROM stores a fixed program (e.g., BIOS) and others. The RAM is a high-speed and volatile storage element, for example, a dynamic random access memory (DRAM), and temporarily stores a program executed by a processor and data used at the time of execution of a program. The auxiliary storage device is formed of, for example, a large-capacity and non-volatile storage device such as a magnetic storage device (HDD) and a flash memory (SSD), and stores a program to be executed by a processor and data to be used at the time of execution of a program. In short, a program is read out from the storage device, loaded onto the memory, and executed by the processor.

Specifically, the input data to be stored in the storage unit 215 is stored in a customer information table 2151, a sensor terminal information table 2152, an operational state external environment information table 2153, and a non-operational state external environment information table 2154. Further, the processing programs include a sensor terminal remaining life calculation program 2251, a sensor terminal consumption level calculation program 2252, a customer reliability level evaluation program 2253, a rental fee calculation program 2254, and a maintenance plan calculation program 2255. Further, the storage unit 215 stores output data, which is acquired as a result of execution of the programs, in a rental fee result table 2155 and a maintenance plan result table 2156.

The programs to be executed by the CPU 213 are supplied to the processing server 21 via a removable medium (e.g., CD-ROM or USB drive) or a network, and stored into the storage device, which is a non-transitory storage medium. It is thus preferred that the processing server 21 include an interface configured to read out data from a removable medium.

The processing server 21 is a computer system constructed on one physical computer or on a plurality of logical or physical computers. The above-mentioned programs may operate on separate threads on the same computer, or may operate on virtual computers constructed on a plurality of physical computer resources. Further, the processing server 21 may be constructed of a cloud system.

Further, in the processing server 21, all or part of the function blocks to be implemented by the programs may be, for example, constructed of a physical integrated circuit (e.g., field-programmable gate array).

Figure 4:
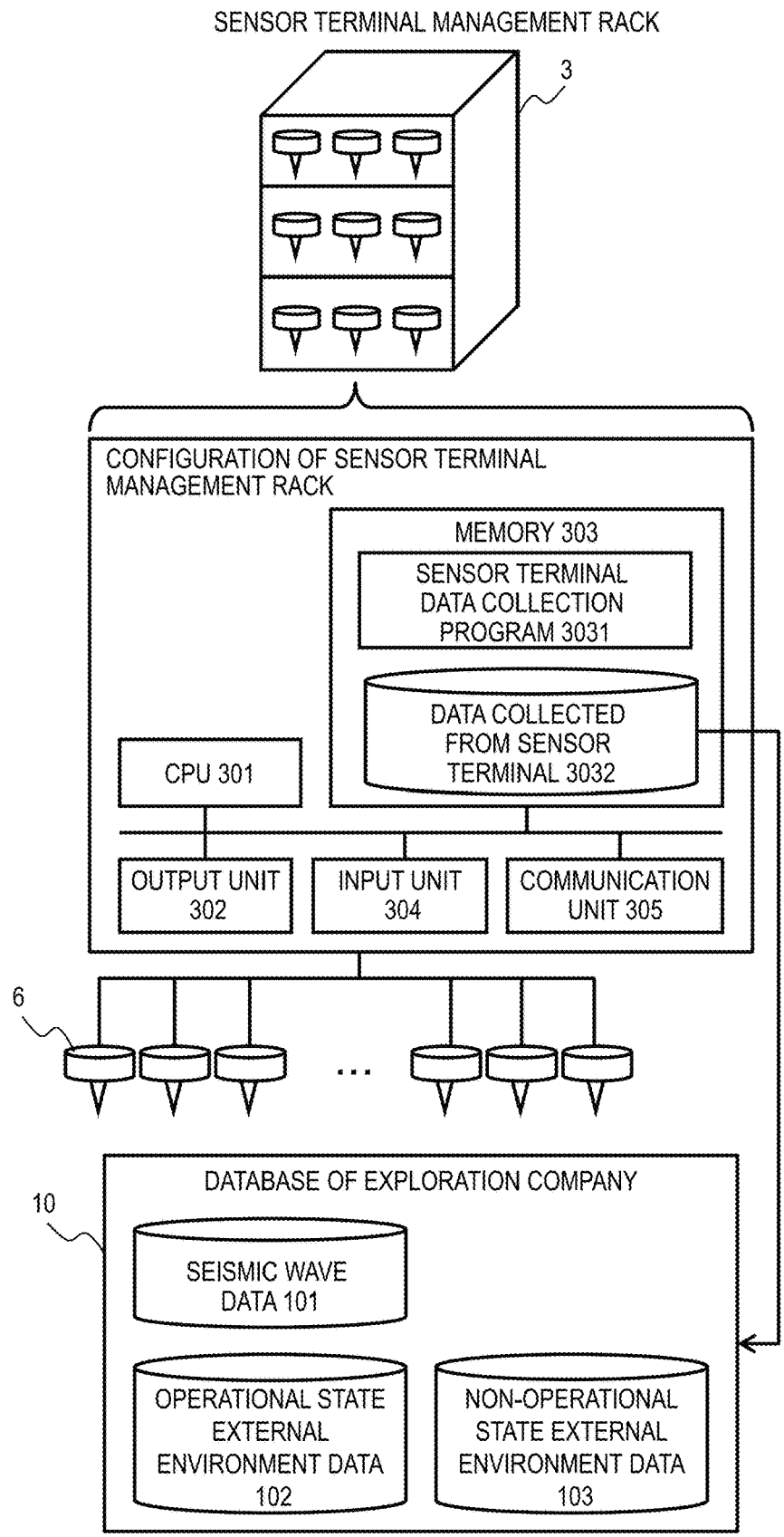
FIG. 4 is a diagram for illustrating a configuration of a sensor terminal management rack.

FIG. 4 is a diagram for illustrating a configuration of the sensor terminal management rack 3.

The sensor terminal management rack 3 collects data from the sensor terminal 6 and charges the sensor terminal 6. It is preferred that data collection and charging be performed on a regular basis (e.g., every time the sensor terminal 6 is used).

The sensor terminal management rack 3 includes a CPU 301, an output unit 302, a memory 303, an input unit 304, and a communication unit 305. The memory 303 stores a sensor terminal data collection program 3031. When being executed by the CPU 301, the sensor terminal data collection program 3031 transfers data accumulated in the sensor terminal 6 to the sensor terminal management rack 3, and stores the data in data 3032 collected from sensor terminal. Data may be transferred from the sensor terminal 6 to the sensor terminal management rack 3 via a data transfer cable physically coupling the sensor terminal 6 and the sensor terminal management rack 3 to each other, via short-range wireless communication, or via a communication network.

The data 3032 collected from sensor terminals (seismic wave data 101, operational state external environment data 102, and non-operational state external environment data 103) is transferred to the database 10 of the exploration company, and of the transferred data, data other than the seismic wave data 101 (e.g., operational state external environment data 102 and non-operational state external environment data 103) is transferred to the database 20 of the rental company. Timing to transfer the operational state external environment data 102 and the non-operational state external environment data 103 to the database 20 of the rental company can be set to any timing by the administrator. For example, the operational state external environment data 102 and the non-operational state external environment data 103 may be collectively transferred when the sensor terminal 6 is returned to the rental company 2, or may be transferred to the database 20 of the rental company when the transfer of data from the sensor terminal 6 to the sensor terminal management rack 3 is finished in the middle of exploration. Further, as described above, the operational state external environment data 102 and the non-operational state external environment data 103 may not be transferred to the database 10 of the OAG exploration company, and may be directly transferred to the database 20 of the rental company without being transferred to the database 10 of the OAG exploration company.

Figure 5A:
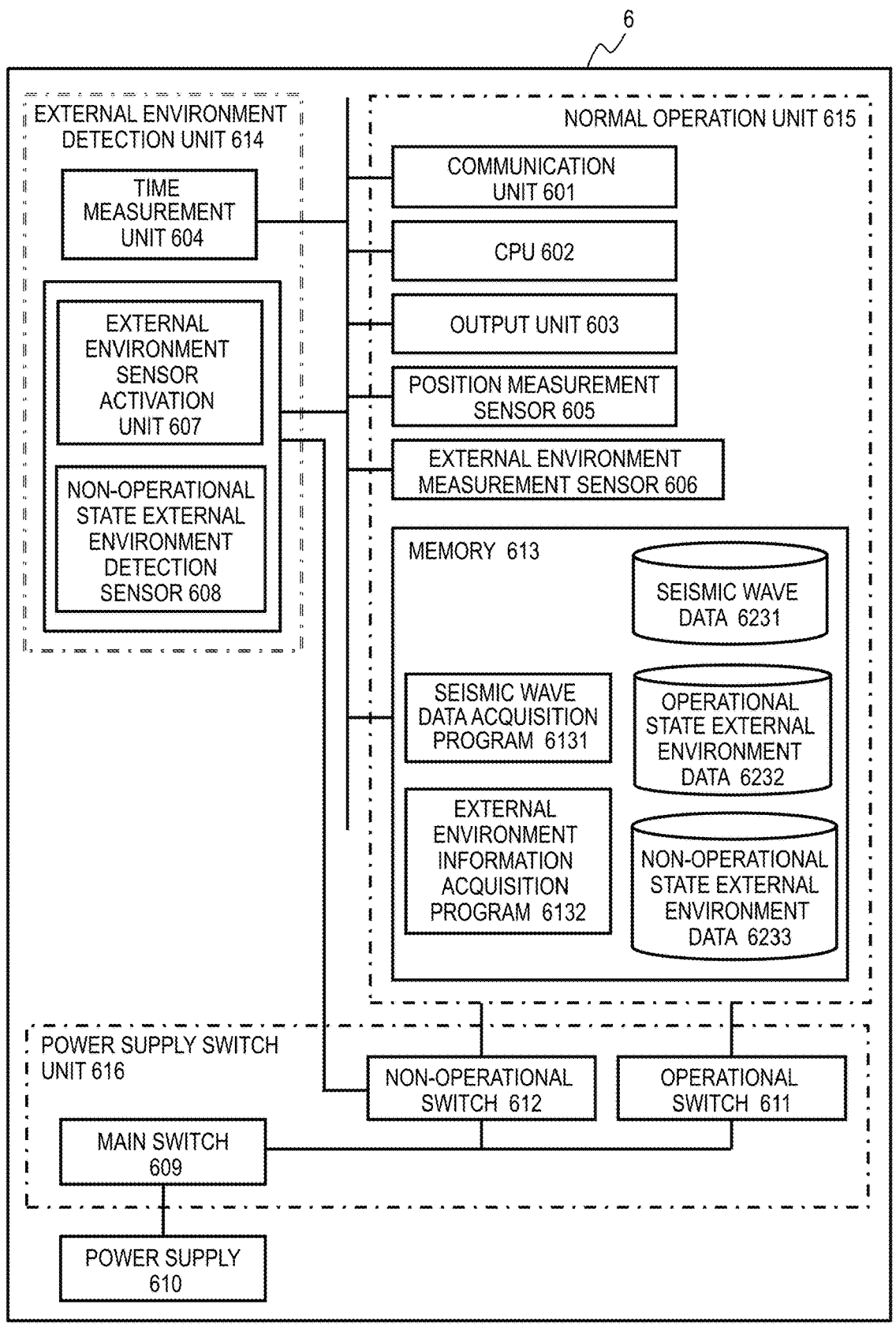
FIG. 5A is a diagram for illustrating an overall configuration of a sensor terminal.
Figure 5B:
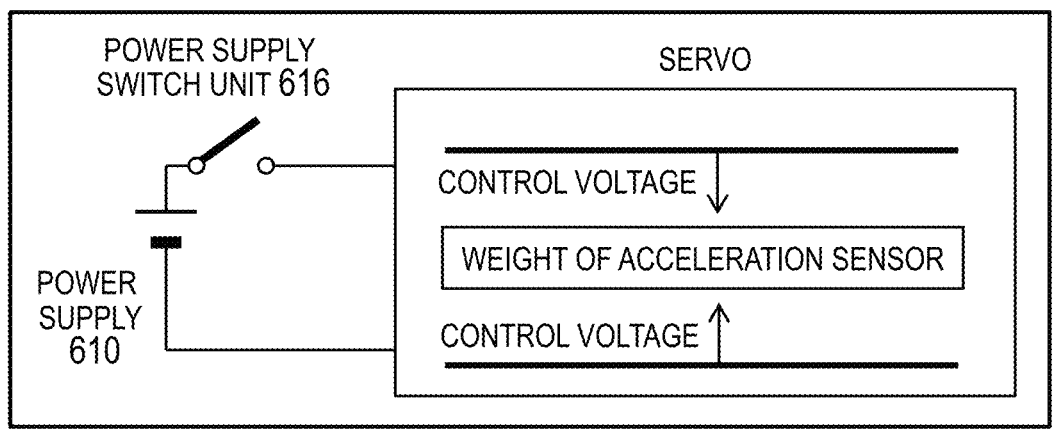
FIG. 5B is a diagram for illustrating how a servo-type acceleration sensor operates.

FIG. 5A is a diagram for illustrating an overall configuration of each sensor terminal 6, and FIG. 5B is a diagram for illustrating how a servo-type acceleration sensor operates.

The sensor terminal 6 is roughly formed of four parts (external environment detection unit 614, normal operation unit 615, power supply switch unit 616, and power supply 610). The external environment detection unit 614 includes a time measurement unit 604, an external environment sensor activation unit 607, and a non-operational state external environment detection sensor 608. The normal operation unit 615 includes a communication unit 601, a CPU 602, an output unit 603, a position measurement sensor 605, the external environment measurement sensor 606, and a memory 613. The power supply switch unit 616 includes a main switch 609, the operational switch 611, and a non-operational switch 612. The power supply 610 includes a battery (secondary battery or primary battery) configured to supply electric power to the sensor terminal 6.

The communication unit 601 is an interface configured to transmit and receive data to and from the sensor terminal management rack 3 via the network. The CPU 602 is a processor configured to execute overall control of operations of sensors and processing programs. The output unit 603 is a device configured to display a state of the sensor terminal and other information, and is formed of an LED lamp, for example. The time measurement unit 604 is a device configured to measure a date/time at which an operation of the sensor terminal 6 has changed and a date/time at which an external environment of the sensor terminal 6 has changed, and is formed of a clock, for example. The position measurement sensor 605 is a sensor configured to measure the position of the sensor terminal 6, and is formed of a global positioning system (GPS) sensor, for example.

The external environment measurement sensor 606 includes a seismic wave measurement sensor configured to detect acceleration (vibration or impact), and may also include a temperature sensor configured to detect temperature, a humidity sensor configured to detect humidity, and an illuminance sensor configured to detect illuminance.

The seismic wave measurement sensor is a sensor configured to measure a seismic wave, and is formed of, as an example, the servo-type acceleration sensor illustrated in FIG. 5B. The seismic wave measurement sensor has the following structure. Specifically, in the seismic wave measurement sensor, a part (servo) configured to perform feedback control is arranged, and in the servo, a weight to be used as an acceleration sensor is provided. When the power supply switch unit 616 is off, the weight provided in the servo of the acceleration sensor is held at a center position by a spring force, and moves in response to an external force exerted on the seismic wave measurement sensor (e.g., vibration or gravitational force).

When the power supply switch unit 616 is on, the servo performs feedback loop control of generating a force in a direction opposite to a direction in which the weight moves with a control voltage (electrostatic force) to fix the weight at a predetermined position. In other words, the seismic wave measurement sensor in a first embodiment of this invention generates a control voltage required to cancel an external force exerted on the weight, and measure the generated voltage, to thereby measure vibration acceleration, for example, a seismic wave. While the sensor is being controlled with voltage (when the main switch 609 and the operational switch 611 are on and the power supply switch unit 616 is on), the weight of the acceleration sensor moves within an allowable range even when vibration or impact is applied to the sensor. Thus, the sensor terminal 6 is less liable to deteriorate. Meanwhile, when the operational switch 611 is off, the servo does not generate a control voltage, and hence the weight of the acceleration sensor is not fixed at the predetermined position. Therefore, the weight of the acceleration sensor moves beyond the allowable range in response to excessive impact, which may cause a failure of the sensor, for example, damage to the weight or deterioration of a spring for supporting the weight or other mechanisms.

As described above, the seismic wave measurement sensor is liable to deteriorate during the non-operational state. In a machine or an apparatus, like the above-mentioned seismic wave measurement sensor, in which the level of deterioration or damage differs depending on how the machine or the apparatus is used during the non-operational state, for example, the storage or transportation, when an external environment during the non-operational state is detected, recorded, and is taken into consideration, the remaining life of the machine or the apparatus can be calculated more accurately than in the related art.

In the first embodiment, the sensor terminal that uses the servo-type acceleration sensor has been described as an example of a machine or an apparatus in which the level of deterioration or damage differs depending on how the machine or the apparatus is used during the operational state and the non-operational state. However, this invention is widely applicable to a system that uses a sensor in which the level of deterioration or damage differs between the operational state and the non-operational state. This invention is also applicable to calculation of a rental fee of a rental apparatus and calculation of a life and maintenance schedule of an apparatus to be maintained.

The external environment sensor activation unit 607 is a device configured to control the non-operational state external environment detection sensor 608 with low power consumption. The non-operational state external environment detection sensor 608 activates the external environment sensor activation unit 607 when detecting that a measured value of the external environment has changed to be larger (or smaller) than a predetermined threshold value. The non-operational state external environment detection sensor 608 may activate the external environment sensor activation unit 607 when detecting a change in the external environment (of a predetermined value or larger). The non-operational state external environment detection sensor 608 is a sensor configured to collect information on its external environment at a location where the sensor terminal 6 is installed, and is a sensor capable of detecting its external environment, for example, a temperature sensor, a humidity sensor, a vibration sensor, or an illuminance sensor. However, the non-operational state external environment detection sensor 608 may be another type of sensor as long as the sensor is capable of measuring a use state and performance of the sensor terminal 6. The non-operational state external environment detection sensor 608 has installed therein a part configured to generate electric power in response to a change in environment, which is, for example, a piezoelectric element configured to generate electric power by being deformed by impact or pressure, a bimetallic element configured to generate electric power in response to a difference in temperature, or a photovoltaic element configured to generate electric power from light, but may also be a device configured to generate electric power from a radio wave, a device configured to generate electric power from dew condensation, or a device configured to generate electric power from an acoustic wave. Further, the non-operational state external environment detection sensor 608 is supplied with electric power from the power supply 610 while the main switch 609 is on, and may be a sensor configured to operate with low power consumption.

The sensor terminal 6 includes the power supply 610. The supply of electric power from the power supply 610 to each unit is controlled by an operation performed by the exploration site worker 5 on the main switch 609 and the operational switch 611. When the exploration site worker 5 switches off the main switch 609, the sensor terminal 6 enters a state in which the entire sensor terminal 6 is not supplied with electric power, to stop operating, and thus data is not recorded in the sensor terminal 6. When the main switch 609 is switched on, the external environment detection unit 614 is activated. The operational state is a state in which the main switch 609 and the operational switch 611 are switched on, and the external environment detection unit 614 and the normal operation unit 615 are supplied with electric power from the power supply 610. The non-operational state is a state in which the main switch 609 is set on but the operational switch 611 is set off, and the external environment detection unit 614 is supplied with electric power from the power supply 610. When the non-operational state external environment detection sensor 608 detects a change in external environment during the non-operational state, the external environment sensor activation unit 607 sets on the non-operational switch 612 so that the normal operation unit 615 is supplied with electric power.

The power supply 610 is formed of one battery configured to supply electric power to the external environment detection unit 614 and the normal operation unit 615. However, power consumption of the external environment detection unit 614 differs from that of the normal operation unit 615, and hence a battery configured to supply electric power to the external environment detection unit 614 and a battery configured to supply electric power to the normal operation unit 615 may be separately provided.

The memory 613 stores data and processing programs of the sensor terminal 6. Specifically, the memory 613 stores a seismic wave data acquisition program 6131 and an external environment information acquisition program 6132. The seismic wave data acquisition program 6131 records seismic wave data 6231. The external environment information acquisition program 6132 records operational state external environment data 6232 and non-operational state external environment data 6233. The memory 613 is only required to be a non-volatile storage device capable of holding data even when the power supply is cut off, and may be formed of a non-volatile memory or a magnetic storage device (HDD).

The operational state external environment data 6232 stores data on an external environment that is measured by the external environment measurement sensor 606 during the operational state. The non-operational state external environment data 6233 stores data on an external environment that is measured by the external environment measurement sensor 606 during the non-operational state. The operational state external environment data 6232 and the non-operational state external environment data 6233 may not be provided as physically divided data, and may be provided as, for example, logically divided data so that the operational state external environment data 6232 and the non-operational state external environment data 6233 can be distinguished from each other with a flag.

Figure 6:
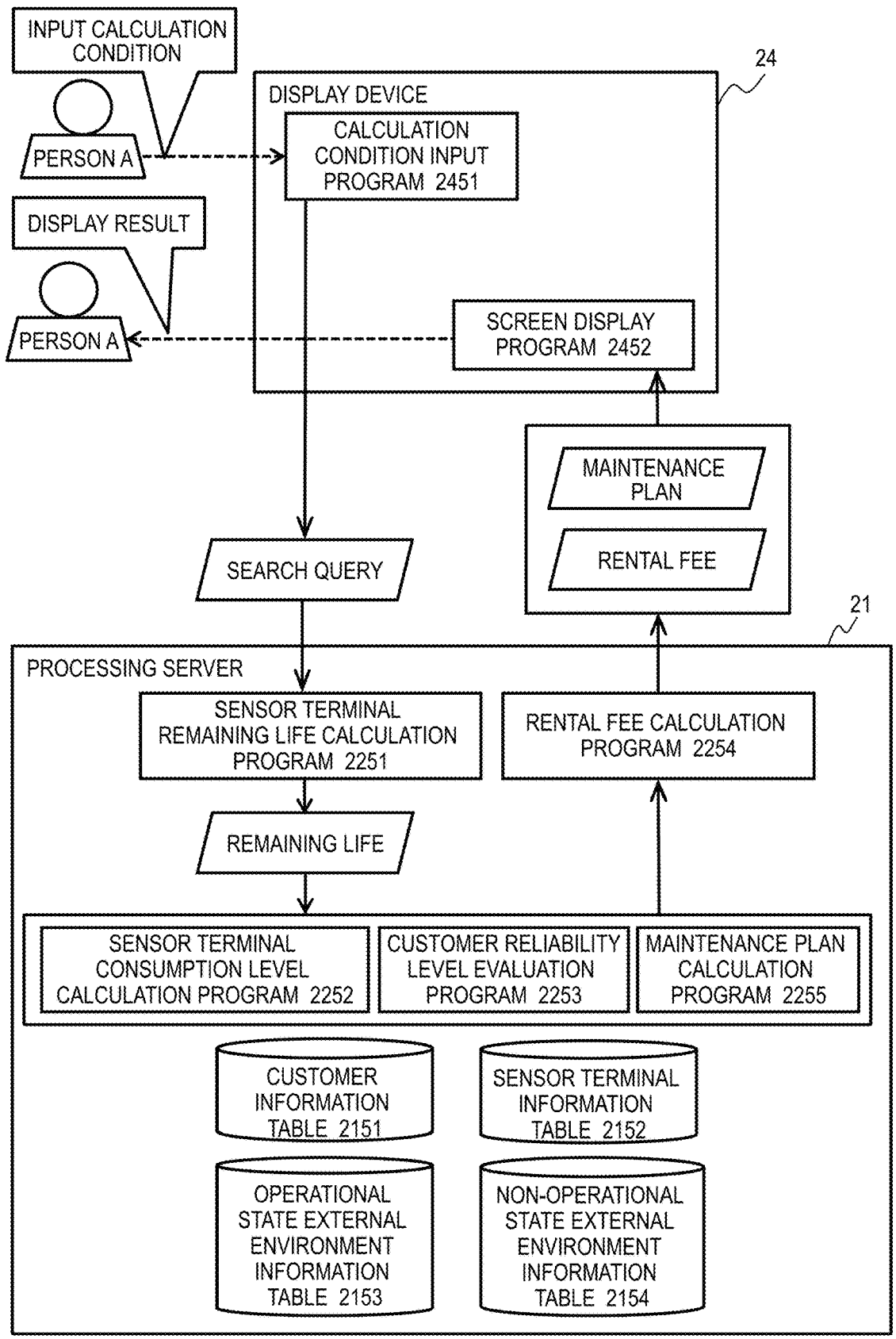
FIG. 6 is a diagram for illustrating an idea of service planning processing performed by the processing server and a display device in the service planning system.

FIG. 6 is a diagram for illustrating an idea of service planning processing performed by the processing server 21 and the display device 24 in the service planning system.

This processing is executed when an employee of the rental company 2 uses the service planning system. First, the employee of the rental company 2 inputs a calculation condition of a service plan to the calculation condition input program 2451 of the display device 24.

The processing server 21 receives a search query for the sensor terminal 6 rented by the OAG exploration company 1, and executes the sensor terminal remaining life calculation program 2251 to calculate the remaining life of the sensor terminal 6. The processing server 21 uses a calculation result of the remaining life to execute the sensor terminal consumption level calculation program 2252, the customer reliability level evaluation program 2253, and the maintenance plan calculation program 2255 to generate a maintenance plan. Further, the processing server 21 uses calculation results of the customer reliability level and the consumption level of the sensor terminal to execute the rental fee calculation program 2254, to thereby calculate a rental fee. Then, the processing server 21 transmits the maintenance plan and the rental fee to the display device 24.

In the display device 24, the screen display program 2452 displays the rental fee and the maintenance plan. The employee of the rental company 2 charges the displayed rental fee to the OAG exploration company 1, and uses the maintenance plan generated by the processing server 21 to receive support on maintenance of the sensor terminal 6, for example, appropriate timing to maintain the sensor terminal 6.

Figure 7:
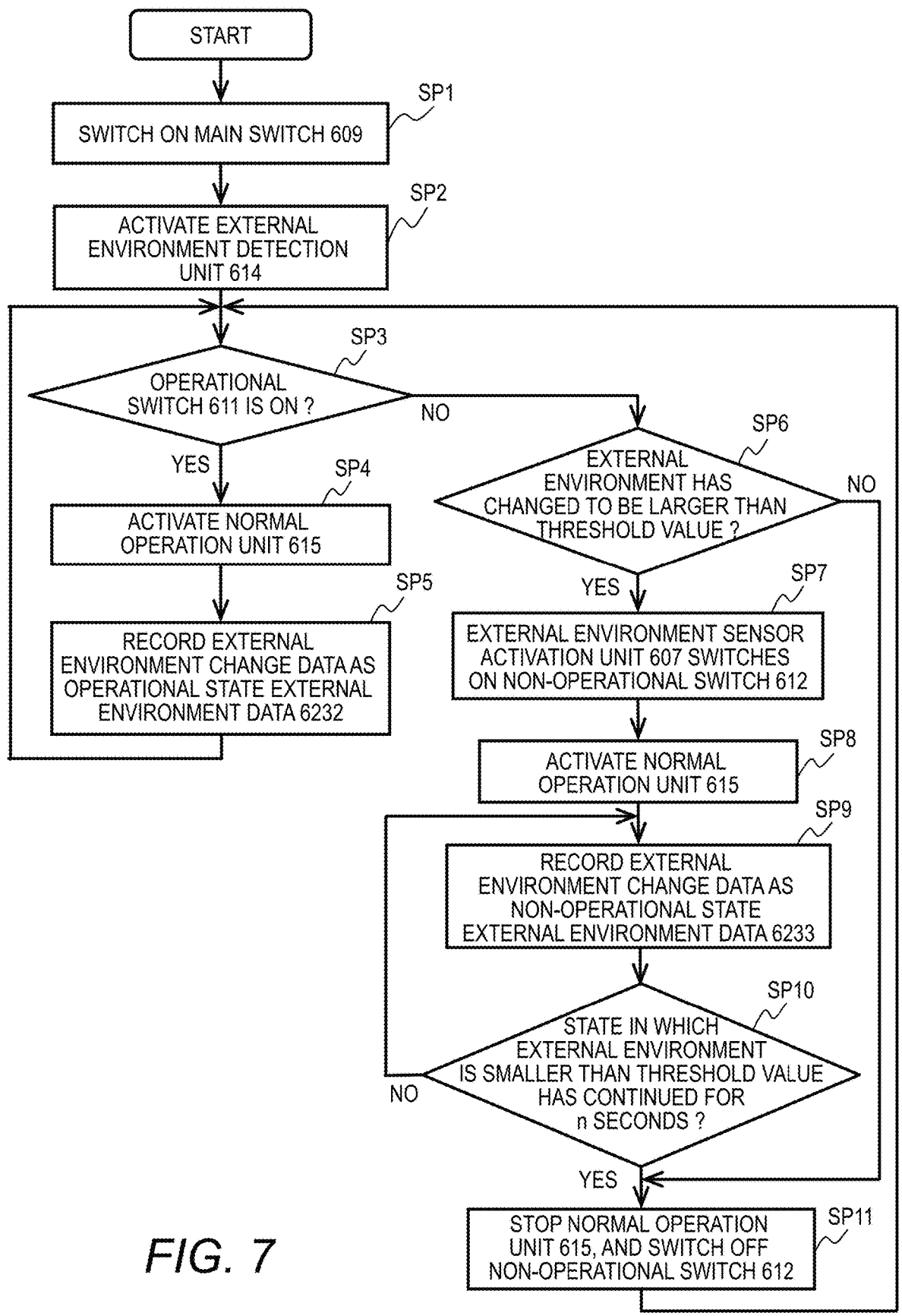
FIG. 7 is a flowchart for illustrating sensor terminal data recording processing.

FIG. 7 is a flowchart for illustrating sensor terminal data recording processing. The sensor terminal data recording processing is processing of recording seismic wave data and external environment data after the sensor terminal 6 is rented.

When the exploration site worker 5 switches on the main switch 609 of the sensor terminal 6 (Step SP1), the external environment detection unit 614 is activated (Step SP2), and the sensor terminal 6 determines whether the operational switch 611 is on or off (Step SP3). When the operational switch 611 is on, the normal operation unit 615 is activated (Step SP4), and the sensor terminal 6 records external environment change data as the operational state external environment data 6232 (Step SP5).

Meanwhile, when the operational switch is off, the non-operational state external environment detection sensor 608 determines a change in external environment (Step SP6). When it is detected that the measured value of the external environment has changed to be larger (or smaller) than a predetermined threshold value, the external environment sensor activation unit 607 switches on the non-operational switch 612 (Step SP7) to activate the normal operation unit 615 (Step SP8). Then, the sensor terminal 6 records the external environment change data as the non-operational state external environment data 6233. When the measured value of the external environment is larger than the predetermined threshold value (NO in Step SP10), the processing returns to Step SP9, and the sensor terminal 6 continues recording the external environment change data.

Meanwhile, a state in which the measured value of the external environment is smaller than the predetermined threshold value has continued for n seconds (YES in Step SP10), the sensor terminal 6 stops the normal operation unit 615, and switches off the non-operational switch 612 (Step SP11). Then, the processing returns to Step SP3, and the sensor terminal 6 enters a power-saving mode.

Recording of data during a sensor terminal rental period starts when the main switch 609 is switched on after the OAG exploration company 1 rents the sensor terminal 6 from the rental company 2, and ends when the OAG exploration company 1 returns the sensor terminal 6 to the rental company 2 after finishing the exploration, and then the main switch 609 is switched off.

Figure 8A:
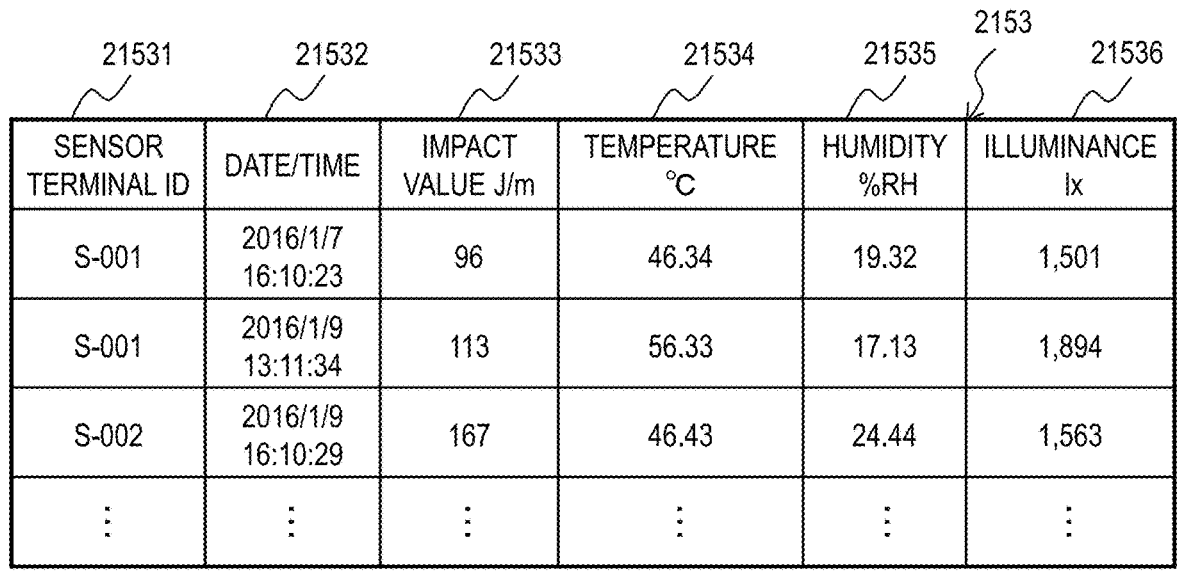
FIG. 8A is a diagram for illustrating a configuration example of an operational state external environment information table.
Figure 8B:
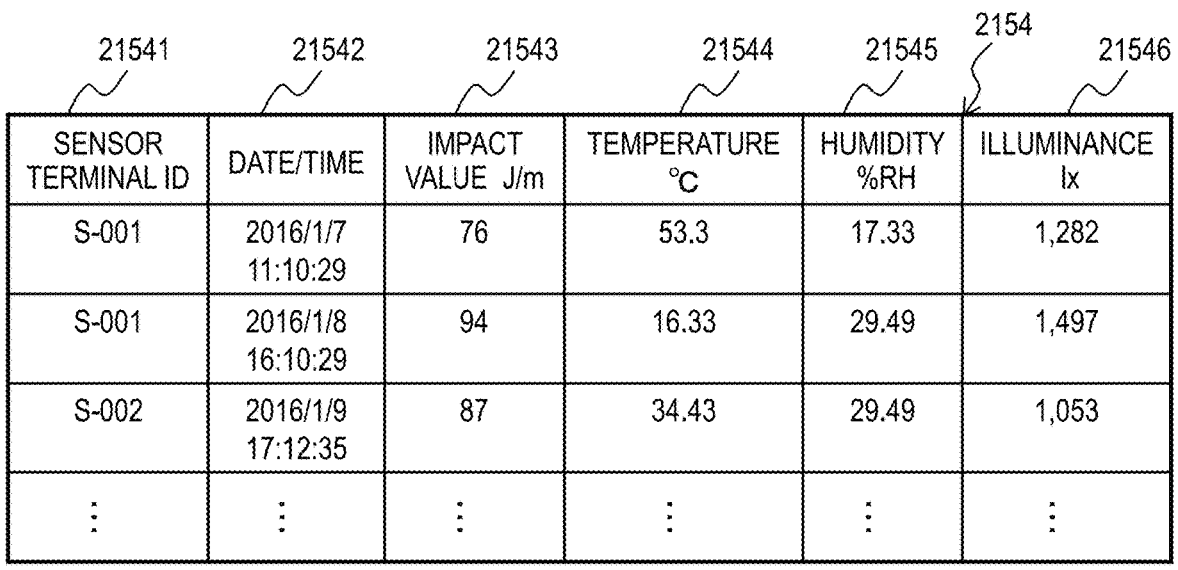
FIG. 8B is a diagram for illustrating a configuration example of a non-operational state external environment information table.

FIG. 8A is a diagram for illustrating a configuration example of the operational state external environment information table, and FIG. 8B is a diagram for illustrating a configuration example of the non-operational state external environment information table. Referring to FIG. 8A and FIG. 8B, a description is given of a case in which the external environment measurement sensor 606 is formed of an acceleration sensor, a temperature sensor, a humidity sensor, and an illuminance sensor to measure acceleration (vibration or impact), temperature, humidity, and illuminance.

The external environment information tables store data collected by the external environment measurement sensor 606 and the non-operational state external environment detection sensor 608, and information obtained during the operational state and information obtained during the non-operational state are separately managed. In the first embodiment, information obtained during the operational state and information obtained during the non-operational state are recorded in separate tables, but may be recorded in one table in a manner that allows the operational data and the non-operational data to be distinguished from each other.

As shown in FIG. 8A, the operational state external environment information table 2153 includes a "sensor terminal ID" field 21531, a "date/time" field 21532, an "impact value" field 21533, a "temperature" field 21534, a "humidity" field 21535, and an "illuminance" field 21536, and sensor values measured by the external environment measurement sensor 606 and a date/time of measurement are recorded in association with each other.

As shown in FIG. 8B, the non-operational state external environment information table 2154 includes a "sensor terminal ID" field 21541, a "date/time" field 21542, an "impact value" field 21543, a "temperature" field 215344, a "humidity" field 21545, and an "illuminance" field 21546, and sensor values measured by the non-operational state external environment detection sensor 608 and a date/time of measurement are recorded in association with each other.

FIG. 9 is a diagram for illustrating a configuration example of the sensor terminal information table 2152.

The sensor terminal information table 2152 stores information on each sensor terminal itself. The sensor terminal information table 2152 includes a "sensor terminal ID" field 21521, a "date of purchase" field 21522, a "life at time of purchase" field 21523, an "accumulated hours of life decreased due to excessive impact during non-operational state and operation state at time of last update" field 21524, a "remaining life at time of last update" field 21525, an "individual consumption level of sensor terminal" field 21526, a "customer ID" field 21527, a "rental period" field 21528, and a "last update date/time" field 21529.

The "sensor terminal ID" field 21521 records an identification number assigned by the rental company 2 to manage the sensor terminal 6. Information of the "date of purchase" field 21522 and information of the "life at time of purchase" field 21523 record information that can be obtained when the rental company 2 purchases the sensor terminal. Information of the "date of purchase" field 21522 is a date on which the rental company 2 purchased the sensor terminal, and the "life at time of purchase" field 21523 records a design life of the sensor terminal 6.

The "accumulated hours of life decreased due to excessive impact during non-operational state and operation state at time of last update" field 21524 records, for example, a calculation result of a calculation expression shown in FIG. 11A. The "remaining life at time of last update" field 21525 records a calculation result of a calculation expression shown in FIG. 11C. The "individual consumption level of sensor terminal" field 21526 records a calculation result of a calculation expression shown in FIG. 13.

The "customer ID" field 21527 records a management number assigned by the rental company to a customer renting the sensor terminal 6. The "rental period" field 21528 records a period in which the customer rented the sensor terminal. The "last update date/time" field 21529 records a date/time at which the sensor terminal information was last updated.

Figure 10:
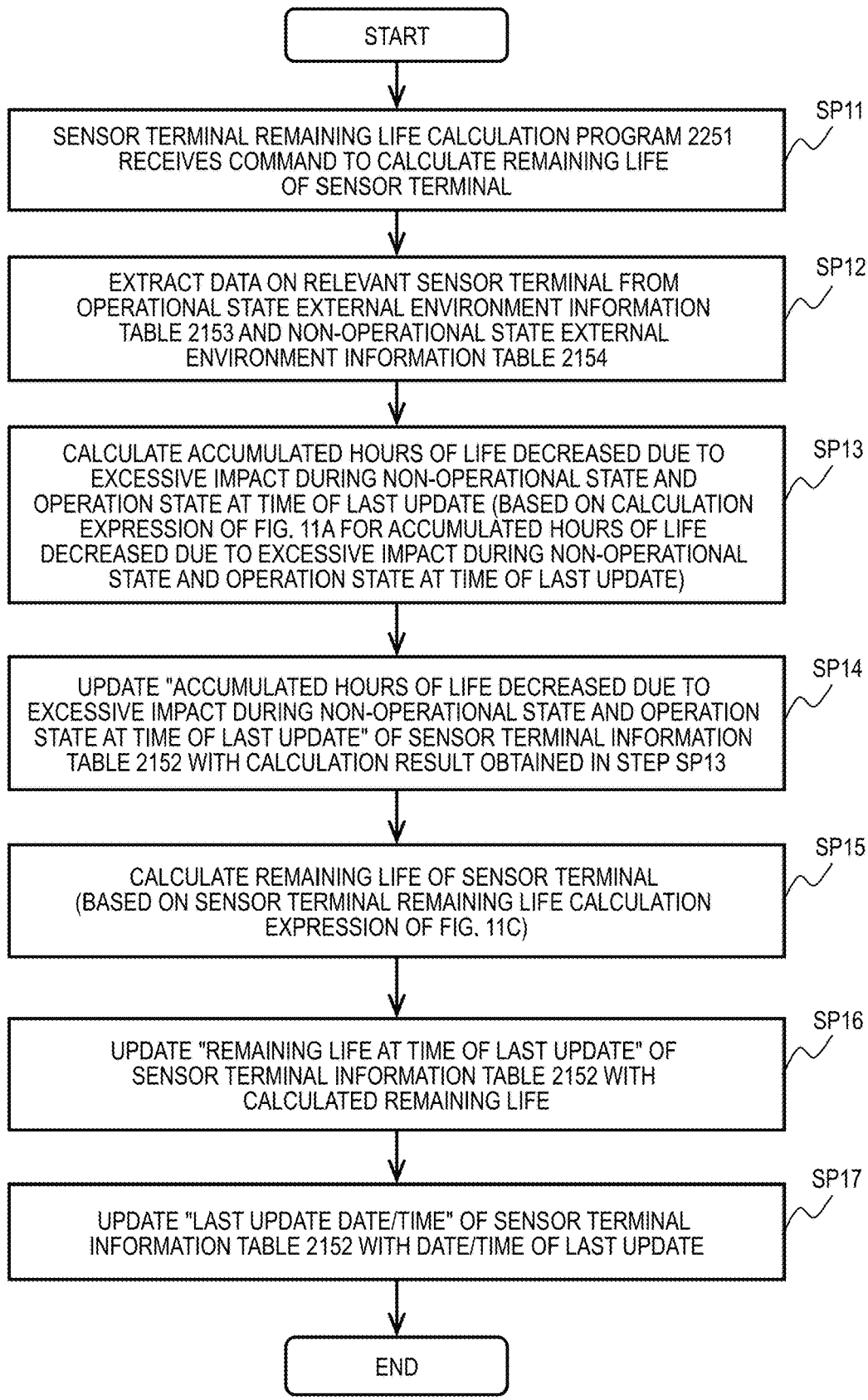
FIG. 10 is a flowchart for illustrating sensor terminal remaining life calculation processing.

FIG. 10 is a flowchart for illustrating sensor terminal remaining life calculation processing. The sensor terminal remaining life calculation processing is executed by the sensor terminal remaining life calculation program 2251 installed on the processing server 21.

First, the CPU 213 of the processing server 21 receives a command to calculate a remaining life of the sensor terminal 6 (Step SP11). Next, the CPU 213 extracts data on the relevant sensor terminal from the operational state external environment information table 2153 and the non-operational state external environment information table 2154 (Step SP12). Next, the CPU 213 uses the calculation expression shown in FIG. 11A to calculate accumulated hours of life decreased due to excessive impact during the non-operational state and the operation state at the time of last update (Step SP13). At this time, the CPU 213 uses a conversion table shown in FIG. 11B to calculate hours of life decreased due to an excess value of impact during the operational state and hours of life decreased due to an excess value of impact during the non-operational state. Next, the CPU 213 updates the "accumulated hours of life decreased due to excessive impact during non-operational state and operation state at time of last update" field 21524 of the sensor terminal information table 2152 with the calculation result obtained in Step SP13 (Step SP14).

Next, the CPU 213 uses the calculation expression shown in FIG. 11C to calculate the remaining life of the sensor terminal (Step SP15). Next, the CPU 213 updates the "remaining life at time of last update" field 21525 of the sensor terminal information table 2152 with the calculated remaining life (Step SP16). Next, the CPU 213 updates the "last update date/time" field 21529 of the sensor terminal information table 2152 with a date/time of the last update (Step SP17), and ends this processing.

FIG. 11C is a diagram for illustrating an example of an expression for calculating the sensor terminal remaining life.

The remaining life of the sensor terminal is a value obtained by subtracting, from a life at the time of purchase, a decrease in life due to aged deterioration at the time of calculation and excessive impact exerted during the non-operational state and the operation state. The life at the time of purchase can be obtained from the "life at time of purchase" field 21523 of the sensor terminal information table 2152. The decrease in life due to the aged deterioration at the time of calculation is a decrease in life due to a normal use of the sensor terminal 6, and is calculated by the rental company based on a calculation expression for sensor terminal aged deterioration. The accumulated hours of life decreased due to excessive impact during the non-operational state and the operation state at the time of last update are a sum of "accumulated hours of life decreased due to excessive impact during the non-operational state and the operation state at the time of last update" before update and "hours of life decreased due to excessive impact during the non-operational state and the operation state" from the time of last update before the update to a current time point.

The hours of life decreased due to excessive impact exerted on the sensor terminal 6 during the operational state are represented by a function of an excess value of impact during the operational state. Further, the hours of life decreased due to excessive impact exerted on the sensor terminal 6 during the non-operational state are represented by a function of an excess value of impact during the non-operational state. The excess value of impact is represented by a value obtained by subtracting, from a value of impact exerted on the sensor terminal 6, an impact threshold value at which the sensor terminal 6 deteriorates or is damaged. In this case, the impact threshold value is derived by the administrator of the sensor terminal 6 based on processing for each of the sensor terminal 6, which is defined based on a management standard of its own company, and the magnitude of the threshold value of the sensor terminal 6 may differ depending on the configuration thereof. Further, even for the sensor terminal 6 of the same type, the magnitude of the threshold value may differ depending on the rental company.

In the sensor terminal 6 having the servo-type acceleration sensor installed therein as in the first embodiment, because of its internal structure, the deterioration or damage caused by impact exerted on the sensor terminal 6 during the non-operational state is larger than the deterioration or damage caused by impact exerted thereon during the operational state. In order to take the difference in level of deterioration between the operational state and the non-operational state into consideration, even for the same excess value of impact, hours of life decreased due to the excess value of impact during the non-operational state are set larger than hours of life decreased due to the excess value of impact during the operational state.

A table T1 is an example of a conversion table for decrease in life due to excess value of impact during operational state. The conversion table T1 includes an "excess value of impact during operational state" field T11 and an "hours of life decreased due to excess value of impact during operational state" field T12. For example, when an excess value of impact exerted on the sensor terminal 6 during the operational state is 0 or larger and smaller than 10, decreased hours of life are 0.1 hours.

A table T2 is an example of a conversion table for decrease in life due to excess value of impact during the non-operational state. The conversion table T2 includes an "excess value of impact during non-operational state" field T21 and an "hours of life decreased due to excess value of impact during non-operational state" field T22. For example, when an excess value of impact exerted on the sensor terminal 6 during the non-operational state is 0 or larger and smaller than 10, decreased hours of life are 0.3 hours.

The first embodiment is directed to the sensor terminal 6 for underground exploration, which may deteriorate or be damaged greatly due to the impact, and of the external environment information, the impact is a factor that affects the remaining life the greatest. When a remaining life of another type of sensor terminal or apparatus is calculated, a factor that greatly affects the life of the sensor terminal or apparatus may be acquired from an external environment information table to calculate the remaining life. Further, the remaining life may be calculated in consideration of temperature, humidity, or other such information.

As described above, according to the service planning system in the first embodiment, external environment data (e.g., impact, temperature, humidity, or other such data) measured while a machine or an apparatus is not in operation is acquired with low power consumption, and an accurate remaining life and consumption level of the machine or the apparatus can be calculated through use of the acquired information. In addition, the rental fee of the machine or the apparatus can be calculated and the maintenance plan thereof can be created based on the remaining life of the machine or the apparatus.

In particular, when the sensor terminal 6 includes the servo-type acceleration sensor, because of the structure of the acceleration sensor, the deterioration caused by an external factor during the operational state differs from the deterioration caused by an external factor during the non-operational state, for example, during the transportation or storage. Therefore, when the external environment data of the sensor terminal 6 measured during the operational state and the non-operational state is acquired, and the deterioration during the operational state and the deterioration during the non-operational state are calculated by assigning different weights thereto, the remaining life can be calculated more accurately.

Second Embodiment

Now, a description is given of a second embodiment of this invention in which the remaining life calculated in the first embodiment is used to calculate a customer reliability level.

Figure 12:
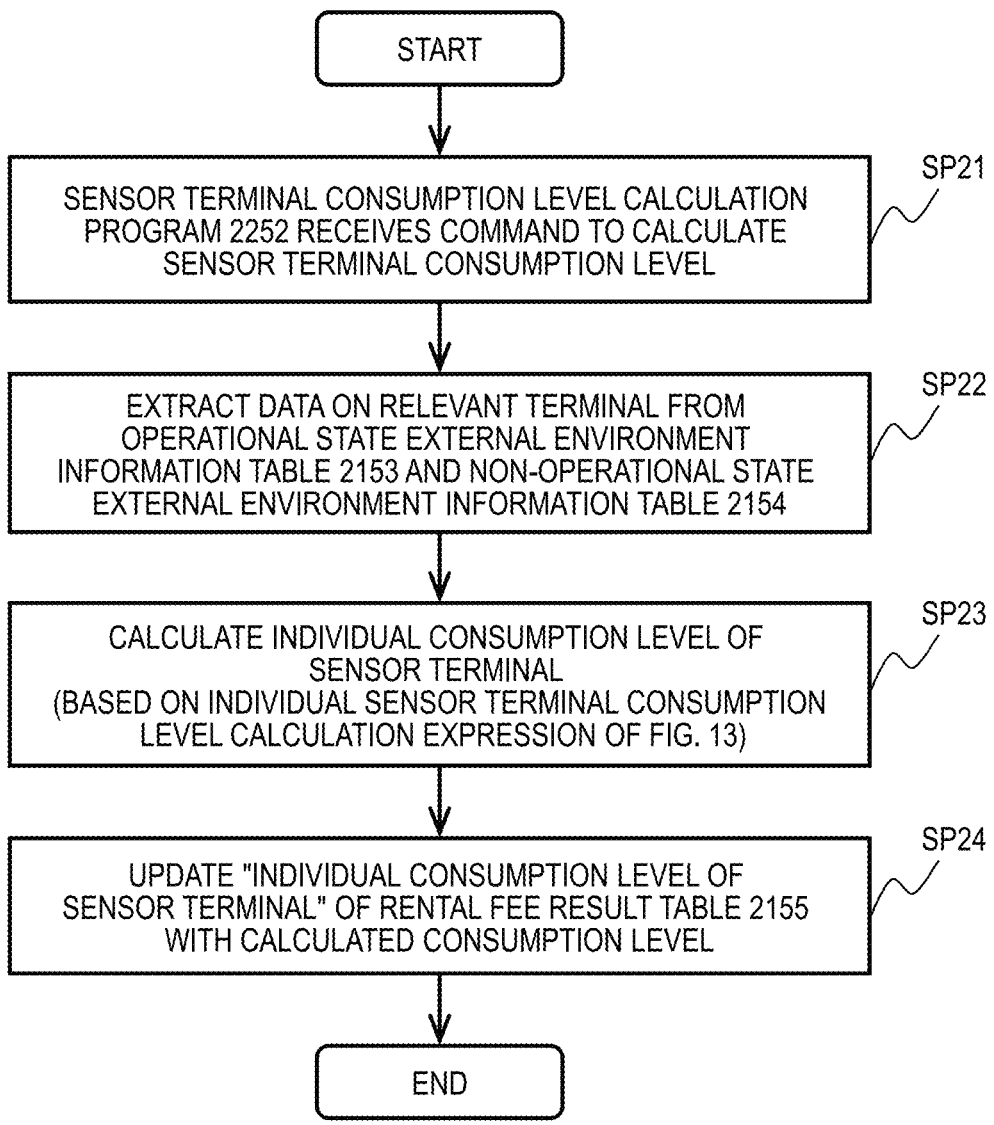
FIG. 12 is a flowchart for illustrating sensor terminal individual consumption level calculation processing.

FIG. 12 is a flowchart for illustrating sensor terminal individual consumption level calculation processing. The sensor terminal individual consumption level calculation processing is executed by the sensor terminal consumption level calculation program 2252 installed on the processing server 21 after the customer returns the sensor terminal 6.

First, the CPU 213 of the processing server 21 receives a command to calculate a sensor terminal consumption level, and identifies the sensor terminal 6 for which the consumption level is to be calculated (Step SP21). Next, the CPU 213 uses an ID of the sensor terminal for which the consumption level is to be calculated to extract data on the relevant sensor terminal from the operational state external environment information table 2153 and the non-operational state external environment information table 2154, which are stored in the processing server 21 (Step SP22).

Next, the CPU 213 uses an individual sensor terminal consumption level calculation expression shown in FIG. 13 to calculate an individual consumption level of the sensor terminal (Step SP23). Next, the CPU 213 updates an "individual consumption level of sensor terminal" field of the sensor terminal information table 2152 with the calculated consumption level (Step SP24), and ends this processing.

FIG. 13 is a diagram for illustrating an example of an expression for calculating the individual sensor terminal consumption level.

The individual consumption level of a sensor terminal is a ratio of a decrease in life until the time of calculation to a rental period for which the sensor terminal has been rented, and is calculated when the customer returns the sensor terminal 6. The decrease in life until the time of calculation is a sum of hours of life decreased due to excessive impact during the operational state, and hours of life decreased due to excessive impact during the non-operational state within the period for which the sensor terminal has been rented. The hours of life decreased due to excessive impact during the operational state and the hours of life decreased due to excessive impact during the non-operational state are calculated through use of the conversion table T1 for decrease in life due to excess value of impact during operational state and the conversion table T2 for decrease in life due to excess value of impact during non-operational state, respectively, which are shown in FIG. 11B.

FIG. 14 is a diagram for illustrating an example of a configuration of the customer information table 2151.

The customer information table 2151 stores information on how each customer has used a sensor terminal, and includes a "customer ID" field 21511, a "customer name" field 21512, a "customer-by-customer consumption level"

field 21513, a "return rate of sensor terminals" field 21514, a "customer reliability level" field 21515, a "sensor terminal ID" field 21516, a "sensor terminal operational time" field 21517, a "rental start date/time" field 21518, and a "return date/time" field 21519.

The "customer ID" field 21511, the "customer name" field 21512, the "sensor terminal ID" field 21516, and the "rental start date/time" field 21518 are input to a sensor terminal management system by the rental company 2 when the customer rents the sensor terminal 6. The "customer-by-customer consumption level" field 21513 records a result calculated based on a customer-by-customer consumption level calculation expression of FIG. 16C, and is a moving average value of consumption levels of all rented sensor terminals 6. The "return rate of sensor terminals" field 21514 records a result calculated based on a sensor terminal return rate calculation expression of FIG. 16A, and is a ratio of the number of sensor terminals 6 returned by the customer to the number of sensor terminals 6 rented to the customer. The "customer reliability level" field 21515 records the reliability level of the customer, which is calculated after the customer returns the sensor terminal.

The "sensor terminal operational time" field 21517 and the "return date/time" field 21519 are input to the sensor terminal management system by the rental company 2 when the customer returns the sensor terminal 6. The sensor terminal operational time is extracted from the sensor terminal information table 2152. When a new customer makes a contract with the rental company, there is no information on a sensor terminal that was used by the customer in the past, and hence the "customer reliability level" field 21515 has no value. In this case, the following advance payment method is desired: a rental fee is calculated based on an existing method at the time of start of rental without taking the customer reliability level into consideration, and the customer is charged with the calculated rental fee. As another example, the following deferred payment method may be adopted: when a customer returns a sensor terminal, a reliability level of the customer is evaluated based on a remaining life of the sensor terminal, and a rental fee is calculated in consideration of the calculated reliability level.

Figure 15:
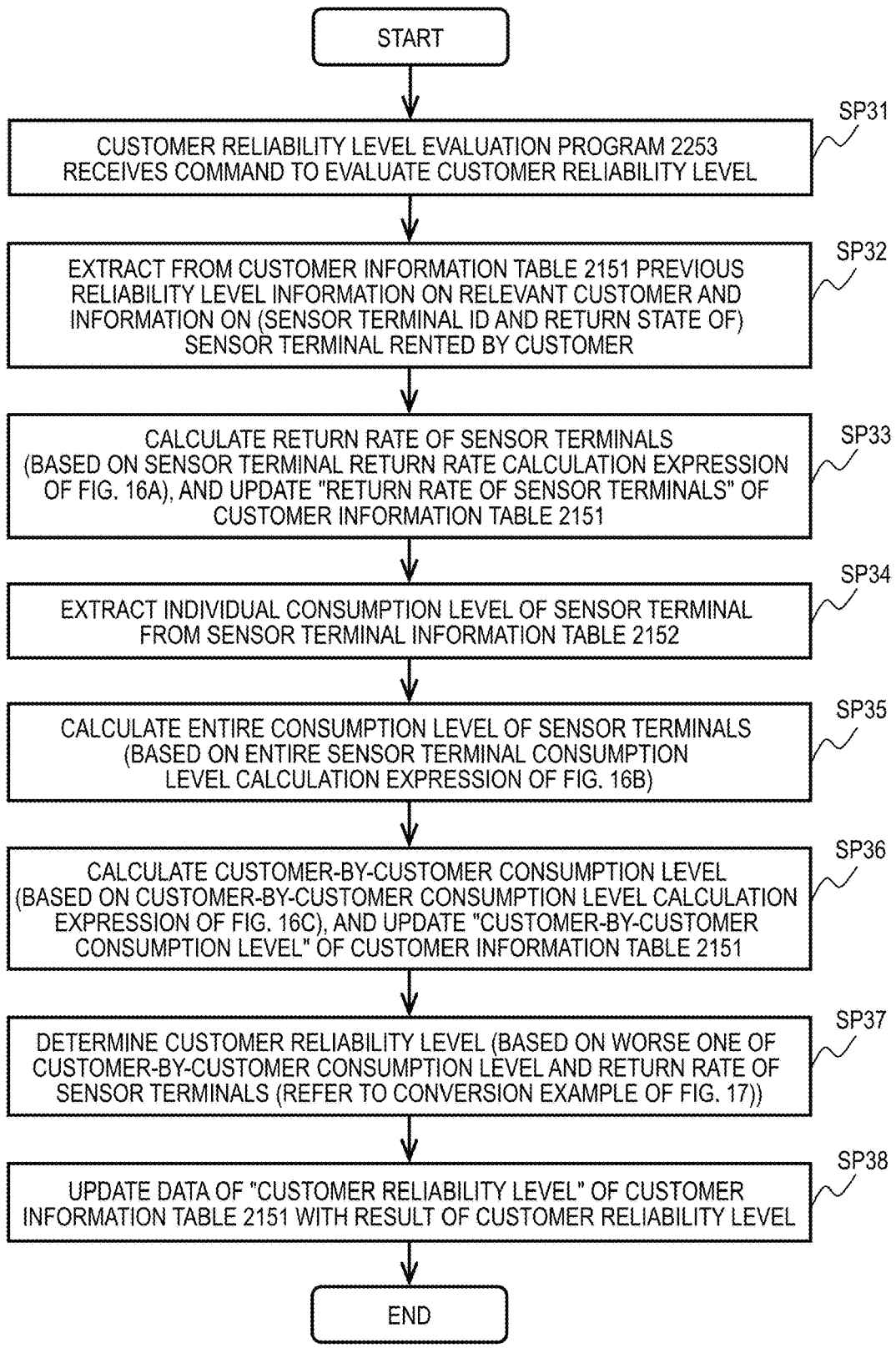
FIG. 15 is a flowchart for illustrating customer reliability level evaluation processing.

FIG. 15 is a flowchart for illustrating customer reliability level evaluation processing. The customer reliability level evaluation processing is executed by the customer reliability level evaluation program 2253 installed on the processing server 21 after the customer returns the sensor terminal when the rental period ends.

First, the CPU 213 of the processing server 21 receives a command to evaluate a customer reliability level (Step SP31). Next, the CPU 213 extracts from the customer information table 2151 information on the sensor terminal rented by the customer (Step SP32), uses the sensor terminal return rate calculation expression of FIG. 16A to calculate a return rate of sensor terminals, and updates the "return rate of sensor terminals" of the customer information table 2151 (Step SP33).

Next, the CPU 213 extracts an individual consumption level of the sensor terminal from the sensor terminal information table 2152 (Step SP34), and uses an entire sensor terminal consumption level calculation expression of FIG. 16B to calculate an entire consumption level of the sensor terminals (Step SP35). Next, the CPU 213 uses a customer-by-customer consumption level calculation expression of FIG. 16C to calculate a customer-by-customer consumption level, and updates data of the "customer-by-customer consumption level" of the customer information table 2151 (Step SP36).

Figure 17:
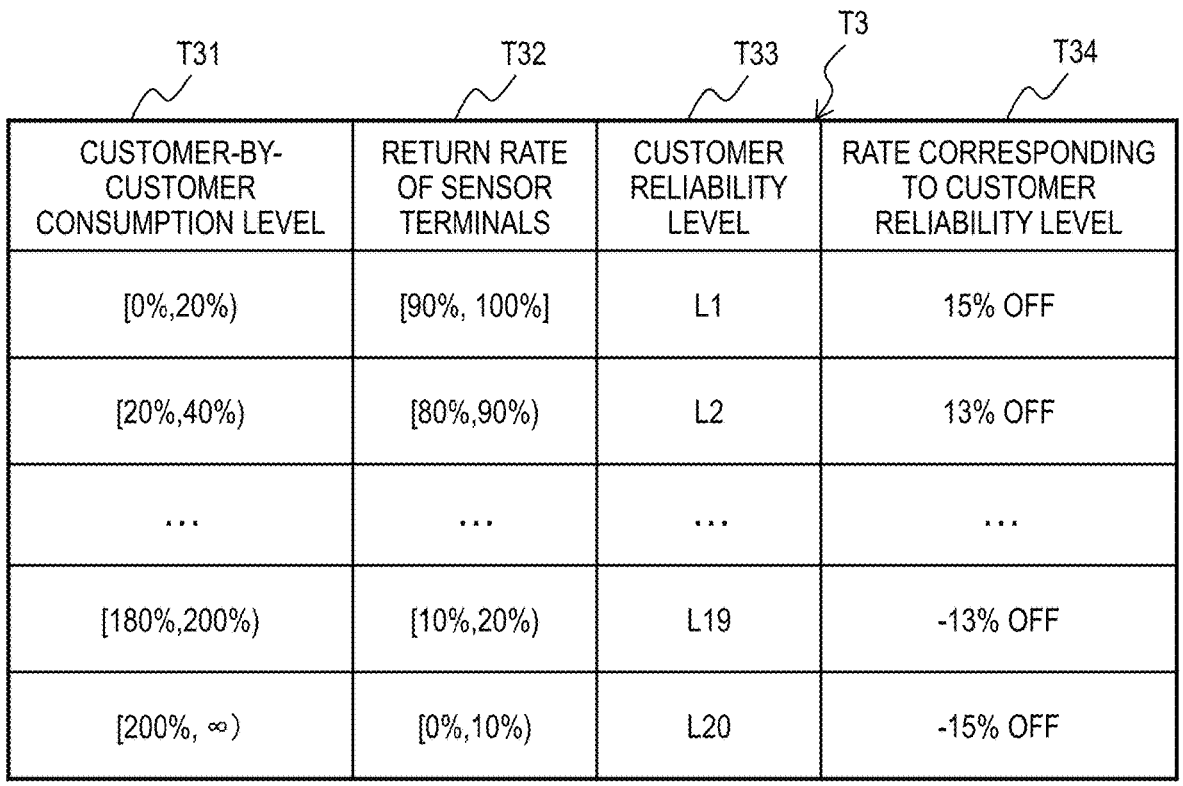
FIG. 17 is a table for showing an example of a table for customer reliability level evaluation method and conversion into rate corresponding to customer reliability level.

Next, the CPU 213 refers to a conversion example of FIG. 17 to determine the customer reliability level based on a worse one of the customer-by-customer consumption level and the return rate of sensor terminals (Step SP37). Next, the CPU 213 updates data of the "customer reliability level" of the customer information table 2151 with the customer reliability level obtained as a result (Step SP38), and ends this processing.

FIG. 16A is a diagram for illustrating an example of an expression for calculating the sensor terminal return rate. FIG. 16B is a diagram for illustrating an example of an expression for calculating the entire sensor terminal consumption level. FIG. 16C is a diagram for illustrating an example of an expression for calculating the customer-by-customer consumption level.

In the calculation expression shown in FIG. 16A, the number of sensor terminals 6 returned by the customer is divided by the number of sensor terminals 6 rented to the customer to calculate the return rate of sensor terminals.

In the calculation expression shown in FIG. 16B, the entire consumption level of the sensor terminals is calculated as an arithmetic mean value of the individual consumption level of the sensor terminal.

In the calculation expression shown in FIG. 16C, the customer-by-customer consumption level is calculated as a moving average value of the customer-by-customer consumption level of the relevant customer until the time of calculation.

FIG. 17 is a diagram for illustrating an example of a table for customer reliability level evaluation method and conversion into rate corresponding to customer reliability level.

A table T3 for customer reliability level evaluation method and conversion into rate corresponding to customer reliability level includes a customer-by-customer consumption level T31, a return rate of sensor terminals T32, a customer reliability level T33, and a rate corresponding to customer reliability level T34. The customer reliability level T33 is evaluated based on the customer-by-customer consumption level T31 and the return rate of sensor terminals T32.

For example, the customer reliability level is determined based on a worse one of the values of the customer-by-customer consumption level and the return rate of sensor terminals. Specifically, when a customer-by-customer consumption level of a given customer is 35%, and a sensor terminal return rate of this customer is 97%, the customer reliability level of this customer is evaluated based on the customer-by-customer consumption level of 35%, which is a worse value, and thus determined to be "L2".

Further, the rate corresponding to customer reliability level T34 is set based on the customer reliability level T33, which is an evaluation result. When the customer reliability level is high, the rental fee is discounted by a large amount, whereas when the customer reliability level is low, the rental fee is increased. For example, the rental fee of a customer whose customer reliability level is evaluated as "L2" is discounted at 13 percent. Meanwhile, the rental fee of a customer whose customer reliability level is evaluated as "L20" is increased by 15 percent.

Figure 18:
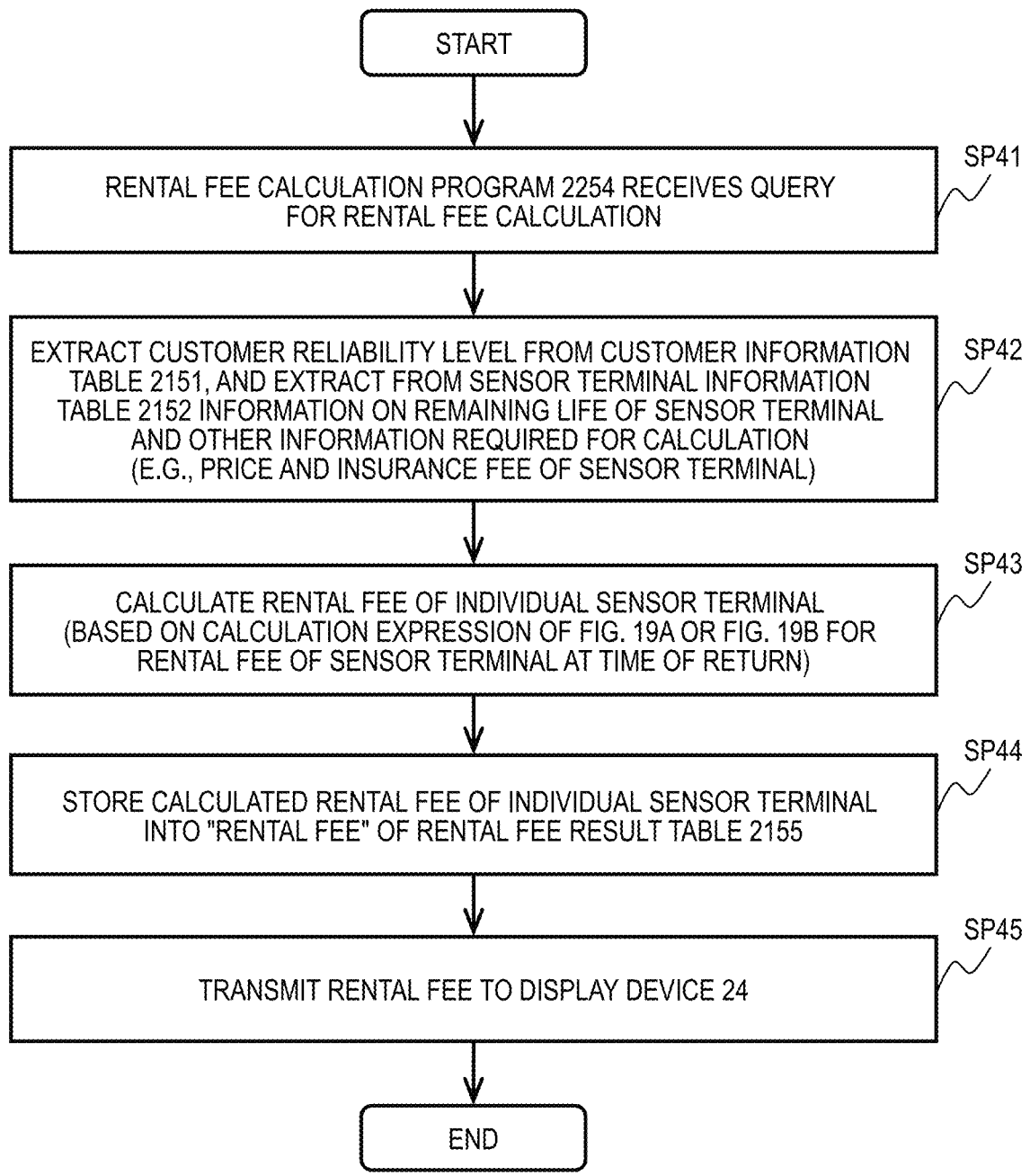
FIG. 18 is a flowchart for illustrating processing of calculating a sensor terminal rental fee at the time of return.

FIG. 18 is a flowchart for illustrating processing of calculating a sensor terminal rental fee at the time of return. The rental fee calculation processing is executed by the rental fee calculation program 2254 installed on the processing server 21 after the customer returns the sensor terminal when the rental period ends.

First, the CPU 213 of the processing server 21 receives a query for rental fee calculation, which includes information on a customer name or a customer ID (Step SP41). Next, the CPU 213 extracts the customer reliability level from the customer information table 2151, and extracts from the sensor terminal information table 2152 information on the remaining life of the sensor terminal and other information required for the calculation (e.g., price and insurance fee of sensor terminal) (Step SP42).

Next, the CPU 213 uses a calculation expression of FIG. 19A or FIG. 19B for a rental fee at the time of return to calculate the rental fee (Step SP43), and stores the calculated rental fee into a "rental fee" field of the rental fee result table 2155 (Step SP44). Next, the CPU 213 transmits the calculated rental fee to the display device 24 (Step SP45), and ends this processing.

FIG. 19A is an expression for showing an example of a calculation expression for a rental fee of an individual sensor terminal at the time of return in which the customer reliability level is not taken into consideration, and FIG. 19B is an expression for showing an example of a calculation expression for a rental fee of an individual sensor terminal at the time of return in which the customer reliability level is taken into consideration.

The calculation of a rental fee of a sensor terminal at the time of return is applied to a case in which the rental company does not grasp the reliability level of a new customer. In this case, a rental fee is paid after the sensor terminal is returned, and there are two calculation expressions for the rental fee. The calculation expression of FIG. 19A is an example of the calculation expression for a rental fee at the time of return in which the customer reliability level is not taken into consideration, and the rental fee is calculated through use of the price, interest rate, tax, insurance fee, maintenance and storage cost, and profit of the sensor terminal, and the remaining life, rental turnover rate, and rental hours of the sensor terminal. The calculation expression of FIG. 19B is an example of the calculation expression for a rental fee at the time of return in which the customer reliability level is taken into consideration, and a final rental fee is calculated in consideration of a rate corresponding to the customer reliability level in addition to the elements of the calculation expression of FIG. 19A.

Figure 20:
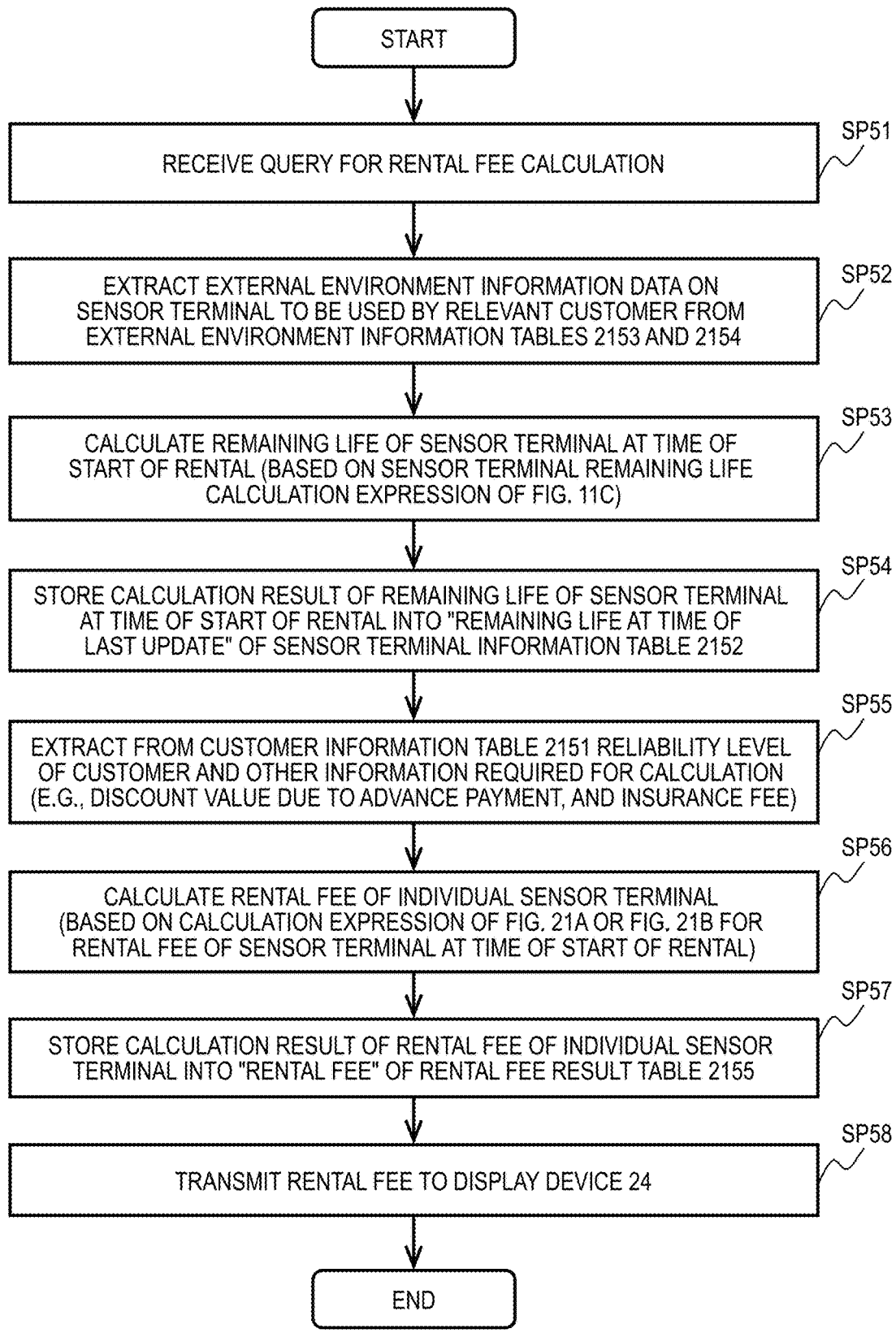
FIG. 20 is a flowchart for illustrating processing of calculating a sensor terminal rental fee at the time of start of rental.

FIG. 20 is a flowchart for illustrating processing of calculating a sensor terminal rental fee at the time of start of rental. The rental fee calculation processing illustrated in FIG. 20 is executed by the rental fee calculation program 2254 installed on the processing server 21 before the sensor terminal 6 is rented. The rental fee calculation processing illustrated in FIG. 20 is applied when the rental company already grasps the reliability level of the customer, and the rental fee is paid in advance.

First, the CPU 213 of the processing server 21 receives a query for rental fee calculation (Step SP51). Next, the CPU 213 extracts the external environment information on the sensor terminal to be used by the customer from the operational state external environment information table 2153 and the non-operational state external environment information table 2154 (Step SP52).

Next, the CPU 213 uses the sensor terminal remaining life calculation expression of FIG. 11C to calculate the remaining life of the sensor terminal at the time of start of rental (Step SP53), and stores the calculated remaining life of the sensor terminal at the time of start of rental into the "remaining life at time of last update" field 21525 of the sensor terminal information table 2152 (Step SP54).

Next, the CPU 213 extracts from the customer information table 2151 the reliability level of the customer and other information required for the calculation (e.g., discount value due to advance payment, and insurance fee) (Step SP55). Next, the CPU 213 uses a calculation expression of FIG. 21A or FIG. 21B for a rental fee of the sensor terminal at the time of start of rental to calculate a rental fee of the individual sensor terminal 6 (Step SP56), and stores the calculated rental fee of the individual sensor terminal into the "rental fee" field of the rental fee result table 2155 (Step SP57).

Next, the CPU 213 transmits the resultant rental fee to the display device 24 (Step SP57), and ends this processing.

FIG. 21A is a diagram for illustrating an example of an expression for calculating a rental fee of an individual sensor terminal at the time of start of rental in which the customer reliability level is not taken into consideration, and FIG. 21B is a diagram for illustrating an example of an expression for calculating a rental fee of an individual sensor terminal at the time of start of rental in which the customer reliability level is taken into consideration.

The rental fee to be paid in advance is calculated in consideration of the discount due to advance payment unlike in the calculation expressions shown in FIG. 19A and FIG. 19B. When the rental fee is paid in advance, there is a disadvantage to the customer in that the customer pays the fee before using the sensor terminal 6, and hence a more reasonable rental fee can be set by calculating the fee in consideration of the discount due to advance payment. There are two calculation expressions for a rental fee of an individual sensor terminal at the time of start of rental. The calculation expression of FIG. 21A is an example of the calculation expression for a rental fee of an individual sensor terminal at the time of start of rental in which the customer reliability level is not taken into consideration, and the rental fee is calculated through use of the price, interest rate, tax, insurance fee, maintenance and storage cost, and profit of the sensor terminal, and the remaining life, rental turnover rate, rental hours, and discount rate due to advance payment of the sensor terminal. The calculation expression of FIG. 21B is an example of the calculation expression for a rental fee of an individual sensor terminal at the time of start of rental in which the customer reliability level is taken into consideration, and a final rental fee is calculated in consideration of a rate corresponding to the customer reliability level in addition to the elements of the calculation expression of FIG. 21A.

FIG. 22 is a table for showing a configuration example of the rental fee result table 2155.

The rental fee result table 2155 stores information on the calculation of the rental fee, and includes a "sensor terminal ID" field 21551, a "customer ID" field 21552, a "customer name" field 21553, a "rental hours" field 21554, a "customer reliability level" field 21555, a "rate corresponding to customer reliability level" field 21556, a "remaining life of sensor terminal at time of return" field 21557, a "remaining life of sensor terminal at time of start of rental" field 21558, and a "rental fee" field 21559.

The "sensor terminal ID" field 21551, the "customer ID" field 21552, the "customer name" field 21553, and the "rental hours" field 21554 record information on a rental contract. The "customer reliability level" field 21555 records a result of the customer reliability level evaluation processing. The "rate corresponding to customer reliability level" field 21556 records a rate corresponding to the customer reliability level. The "remaining life of sensor terminal at time of return" field 21557 and the "remaining life of sensor terminal at time of start of rental" field 21558 record results of the sensor terminal remaining life calculation processing. The "rental fee" field 21559 records a result of the rental fee calculation processing. A value recorded in the "rental fee" field 21559 of the rental fee result table 2155 is the rental fee of the individual sensor terminal, and hence a rental fee to be charged to a customer is a total value of rental fees of the respective sensor terminals rented by the customer.

As described above, according to the service planning system in the second embodiment, the sensor terminal 6 includes the sensor configured to detect the external environment, and hence an appropriate rental fee can be calculated through use of the operational information, operational state external environment data, and non-operational state external environment data of the sensor terminal 6. In addition, the reliability level of the customer is evaluated through use of the information on the customer that rents the sensor terminal 6 to calculate the rental fee, and hence an appropriate rental fee can be calculated.

Further, the rental company can grasp a risk of failure of the sensor terminal 6 in a more quantitative manner based on the remaining value of the sensor terminal 6 and the customer reliability level, which are calculated through use of the use history of the sensor terminal 6 during the operational state and the use history thereof during the non-operational state, and can thus set an appropriate rental fee.

Further, the customer of the rental company can rent the sensor terminal 6 at a fee corresponding to its failure risk, and can thus shorten a work period to reduce cost by selecting the sensor terminal 6 having a low risk of failure.

The customer and the rental company can grasp an accurate remaining value of a machine or an apparatus based on the use history of the machine or the apparatus during the operational state and the non-operational state, and can thus maintain the machine or the apparatus efficiently by evaluating its failure risk.

As described above, the service planning system in the second embodiment uses the operational information and the non-operational information on the sensor terminal for OAG exploration to evaluate the reliability level of the customer, but is also applicable to a maintenance planning service. For example, time when the sensor terminal may fail can be predicted based on information on the calculated remaining life of the sensor terminal. When the remaining life of the sensor terminal is equal to or smaller than a threshold value (e.g., 30 days), the sensor terminal may be rented at a lower fee, or may be maintained without being rent. Further, depending on a rental period, it is preferred that the sensor terminal whose remaining life is longer than the rental period be rent. As another example, there may be implemented a usage-based charging service in which information on the operational time of the sensor terminal 6 is used to calculate a usage fee.

In the above-mentioned embodiments, the service planning system for a sensor terminal for OAG exploration of a rental company is described, but the service planning system may be applied not only to the sensor terminal for OAG exploration but also to various apparatus required for seismic exploration, for example, an earthquake simulation vehicle. The service planning system may also be applied to, instead of OAG exploration, an apparatus to be rented in general or an apparatus for which a maintenance contract is to be made (e.g., heavy equipment for construction, automobile, train, elevator, and control equipment).

As described above, according to the embodiments of this invention, the sensor terminal 6 includes: the normal operation unit 615 including: a first sensor (external environment measurement sensor 606) configured to detect an external environment; and the memory 613; the external environment detection unit 614 including a second sensor (non-operational state external environment detection sensor 608) configured to detect an external environment; the power supply switch unit 616 configured to control supply of electric power to the normal operation unit 615; and the power supply 610 configured to supply the electric power to the normal operation unit 615 via the power supply switch unit 616, in which, in an operational mode, the normal operation unit 615 records data measured by the first sensor 606 into the memory 613, and in which, in a non-operational mode, when a measured value obtained by the second sensor 608 satisfies a predetermined condition, the external environment detection unit 614 switches the power supply switch unit 616 so that the power supply switch unit 616 supplies the electric power to the normal operation unit 615, and the normal operation unit 615 records the data measured by the first sensor 606 into the memory 613. Thus, it is possible to accurately calculate the remaining life of the sensor terminal 6 in consideration of the influence exerted during the operational state and the influence exerted during the non-operational state.

Further, the power supply 610 includes a battery, and the external environment detection unit 614 is configured to be supplied with the electric power from the power supply 610 via the power supply switch unit 616. Thus, the normal operation unit 615 and the external environment detection unit 614 operate with a common power supply, and it is not required to mount a power supply for the external environment detection unit 614 in addition to the power supply for the normal operation unit 615. It is therefore possible to simplify the structure of the sensor terminal 6, to thereby reduce cost.

Further, the second sensor 608 includes a device configured to generate an electrical signal in response to a change in environment (e.g., piezoelectric element configured to generate electric power in response to change in force applied thereto), and when a value of the electrical signal generated by the second sensor 608 exceeds a predetermined threshold value, the external environment detection unit 6164 switches the power supply switch unit 616 so that the power supply switch unit 616 supplies the electric power to the normal operation unit 615. Thus, it is possible to reduce power consumption during the non-operational state.

Further, in the operational mode, the normal operation unit 615 records the data measured by the first sensor 606 into the memory 613 as the operational state external environment data 6232, and in the non-operational mode, records the data measured by the first sensor 606 into the memory 613 as the non-operational state external environment data 6233. Thus, the data measured during the operational state and the data measured during the non-operational state are separately recorded, and hence it is possible to separately calculate the influence exerted on the remaining life during the operational state and the influence exerted on the remaining life during the non-operational state.

Further, the power supply switch unit 616 includes: the operational switch 611 configured to control supply of the electric power to the normal operation unit 615 in accordance with an operation performed by an operator; the non-operational switch 612 configured to control supply of the electric power to the normal operation unit 615 in accordance with an instruction given by the external environment detection unit 614; and the main switch 609 configured to supply the electric power supplied from the power supply 610 to the operational switch 611 and the non-operational switch 612. Thus, it is possible to automatically switch the mode from the non-operational mode to the operational mode to automatically activate the normal operation unit 615.

Further, the first sensor 606 includes a seismic wave measurement sensor. Thus, it is possible to apply this invention to the sensor terminal 6 for OAG exploration to accurately calculate the remaining life of the sensor terminal 6 for OAG exploration.

Further, there is provided a planning system including: the sensor terminal 6 including the first sensor 606 and the second sensor 608, each of which is configured to detect an external environment; and the processing server 21 configured to process data measured by the sensor terminal 6, in which, in an operational mode, the sensor terminal 6 records data measured by the first sensor 606 into the memory 613, in which, in a non-operational mode, when a measured value obtained by the second sensor 608 satisfies a predetermined condition, the sensor terminal 6 records the data measured by the first sensor 606 into the memory 613, and in which the processing server 21 is configured to calculate at least one of a remaining life or a consumption level of the sensor terminal 6 through use of the data recorded by the sensor terminal 6. Thus, it is possible to accurately calculate the remaining life of the sensor terminal 6 in consideration of the influence exerted during the operational state and the influence exerted during the non-operational state.

Further, the processing server 21 is configured to: convert the data recorded in the operational mode into first time information (hours of life decreased due to excess value of impact during operational state); convert the data recorded in the non-operational mode into second time information (hours of life decreased due to excess value of impact during non-operational state); and subtract the first time information and the second time information from a most recent remaining life of the sensor terminal 6, to thereby calculate the remaining life. Thus, it is possible to accurately calculate the remaining life of the sensor terminal 6.

Further, the processing server 21 is configured to: convert the data recorded in the operational mode into first time information (hours of life decreased due to excess value of impact during operational state); convert the data recorded in the non-operational mode into second time information (hours of life decreased due to excess value of impact during non-operational state); and divide a sum of the first time information and the second time information by a period for which the sensor terminal 6 has been rented, to thereby calculate the consumption level. Thus, it is possible to accurately calculate the consumption level of the sensor terminal 6.

Further, the processing server 21 is configured to: calculate a return rate of the sensor terminals 6 based on a number of rented sensor terminals 6 and a number of returned sensor terminals 6; and determine a reliability level of a customer that rents the sensor terminal 6 through use of the consumption level and the return rate. Thus, it is possible to accurately estimate the reliability level of the customer.

Further, the processing server 21 is configured to determine a fee at which the sensor terminal 6 is to be rented through use of at least one of the remaining life or the reliability level of the customer. Thus, it is possible to accurately calculate the rental fee of the sensor terminal 6.

Further, the processing server 21 is configured to determine a maintenance plan of the sensor terminal 6 through use of the remaining life. Thus, it is possible to accurately calculate the maintenance plan of the sensor terminal 6.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A sensor apparatus, comprising:
   a normal operation unit including a first sensor configured to detect an external environment and a storage device;
   an external environment detection unit including a second sensor configured to detect an external environment;
   a power supply switch unit configured to control supply of electric power to the normal operation unit; and
   a power supply configured to supply the electric power to the normal operation unit via the power supply switch unit,
   wherein, in an operational mode, the normal operation unit records data measured by the first sensor into the storage device, and
   wherein, in a non-operational mode, when a measured value obtained by the second sensor satisfies a predetermined condition, the external environment detection unit controls the power supply switch unit so that the power supply switch unit supplies the electric power to the normal operation unit, and the normal operation unit records the data measured by the first sensor into the storage device.

2. The sensor apparatus according to claim 1,
   wherein the power supply includes a battery, and
   wherein the external environment detection unit is configured to be supplied with the electric power from the power supply via the power supply switch unit.

3. The sensor apparatus according to claim 1,
   wherein the second sensor includes a device configured to generate an electrical signal in response to a change in environment, and
   wherein, when a value of the electrical signal generated by the second sensor exceeds a predetermined threshold value, the external environment detection unit switches the power supply switch unit so that the power supply switch unit supplies the electric power to the normal operation unit.

4. The sensor apparatus according to claim 1,
   wherein, in the operational mode, the normal operation unit records the data measured by the first sensor into the storage device as operational state data, and wherein, in the non-operational mode, the normal operation unit records the data measured by the first sensor into the storage device as non-operational state data.

5. The sensor apparatus according to claim 1, wherein the power supply switch unit includes:
an operational switch configured to control supply of the electric power to the normal operation unit in accordance with an operation performed by an operator;
a non-operational switch configured to control supply of the electric power to the normal operation unit in accordance with an instruction given by the external environment detection unit; and
a main switch configured to supply the electric power supplied from the power supply to the operational switch and the non-operational switch.

6. The sensor apparatus according to claim 1, wherein the first sensor includes a seismic wave measurement sensor.

7. A planning processing system, comprising:
a processor configured to execute a program;
a storage device configured to store the program; and
an interface configured to collect data from a sensor apparatus including a first sensor and a second sensor, each of which is configured to detect an external environment,
wherein, in an operational mode, the sensor apparatus records data measured by the first sensor into a storage device as operational state data,
wherein, in a non-operational mode, when a measured value obtained by the second sensor satisfies a predetermined condition, the sensor apparatus records the data measured by the first sensor into the storage device as non-operational state data, and
wherein the planning processing system is configured to:
collect the operational state data and the non-operational state data that are recorded by the sensor apparatus; and
calculate at least one of a remaining life or a consumption level of the sensor apparatus through use of the collected operational state data and non-operational state data.

8. The planning processing system according to claim 7, wherein the planning processing system is configured to:
convert the operational state data into first time information;
convert the non-operational state data into second time information; and
subtract the first time information and the second time information from a most recent remaining life of the sensor apparatus, to thereby calculate the remaining life.

9. The planning processing system according to claim 7, wherein the planning processing system is configured to:
convert the operational state data into first time information;
convert the non-operational state data into second time information; and
divide a sum of the first time information and the second time information by a period for which the sensor apparatus has been rented, to thereby calculate the consumption level.

10. The planning processing system according to claim 9, wherein the planning processing system is configured to:
calculate a return rate of the sensor apparatus based on a number of rented sensor apparatus and a number of returned sensor apparatus; and
determine a reliability level of a customer that rents the sensor apparatus through use of the consumption level and the return rate.

11. The planning processing system according to claim 10, wherein the planning processing system is configured to determine a fee at which the sensor apparatus is to be rented through use of at least one of the remaining life or the reliability level of the customer.

12. The planning processing system according to claim 7, wherein the planning processing system is configured to determine a maintenance plan of the sensor apparatus through use of the remaining life.

13. A planning processing method to be executed by a planning processing system,
the planning processing system including: a processor configured to execute a program; a storage apparatus configured to store the program; and an interface configured to collect data from a sensor apparatus,
the sensor apparatus including a first sensor and a second sensor, each of which is configured to detect an external environment,
the sensor apparatus being configured to record, in an operational mode, data measured by the first sensor as operational state data,
the sensor apparatus being configured to record, in a non-operational mode, the data measured by the first sensor as non-operational state data when a measured value obtained by the second sensor satisfies a predetermined condition,
the planning processing method comprising steps of:
collecting, by the planning processing system, the operational state data and the non-operational state data that are recorded by the sensor apparatus; and
calculating, by the planning processing system, at least one of a remaining life or a consumption level of the sensor apparatus through use of the collected operational state data and non-operational state data.

14. The planning processing method according to claim 13, further comprising steps of:
converting, by the planning processing system, the operational state data into first time information;
converting, by the planning processing system, the non-operational state data into second time information; and
subtracting, by the planning processing system, the first time information and the second time information from a most recent remaining life of the sensor apparatus, to thereby calculate the remaining life.

15. The planning processing method according to claim 13, further comprising steps of:
converting, by the planning processing system, the operational state data into first time information;
converting, by the planning processing system, the non-operational state data into second time information; and
dividing, by the planning processing system, a sum of the first time information and the second time information by a period for which the sensor apparatus has been rented, to thereby calculate the consumption level.

* * * * *